US 8,615,263 B2

(12) United States Patent
Madon et al.

(10) Patent No.: US 8,615,263 B2
(45) Date of Patent: Dec. 24, 2013

(54) SYSTEMS AND METHODS FOR EFFICIENT RADIO FREQUENCY SPECTRUM MANAGEMENT IN A SCENARIO INVOLVING MULTIPLE MOBILE VEHICLES

(75) Inventors: Phiroz H. Madon, Old Bridge, NJ (US);
Anthony Triolo, Manalapan, NJ (US);
Carol C. Martin, Fair Haven, NJ (US);
HeeChang Kim, Marlboro, NJ (US);
Gregory P. Pollini, Howell, NJ (US);
Achilles Kogiantis, New York, NY (US)

(73) Assignee: Telcordia Technologies, Inc., Piscataway, NJ (US)

( * ) Notice: Subject to any disclaimer, the term of this patent is extended or adjusted under 35 U.S.C. 154(b) by 233 days.

(21) Appl. No.: 13/285,221

(22) Filed: Oct. 31, 2011

(65) Prior Publication Data
US 2012/0282962 A1    Nov. 8, 2012

Related U.S. Application Data

(60) Provisional application No. 61/481,395, filed on May 2, 2011.

(51) Int. Cl.
*H04B 7/00*      (2006.01)
*H04W 4/00*      (2009.01)

(52) U.S. Cl.
USPC ............................ 455/509; 455/431; 455/464

(58) Field of Classification Search
USPC ......... 455/509; 340/1.1, 500–693.12, 870.01, 340/870.11, 870.16; 701/3, 528
See application file for complete search history.

(56) References Cited

U.S. PATENT DOCUMENTS

| 5,212,804 | A  | * | 5/1993  | Choate ........................... 455/431 |
| 5,428,815 | A  | * | 6/1995  | Grube ............................ 455/447 |
| 5,898,928 | A  | * | 4/1999  | Karlsson et al. ............... 455/450 |
| 6,108,539 | A  |   | 8/2000  | Ray et al. |
| 8,442,519 | B2 | * | 5/2013  | Cruz et al. ..................... 455/431 |
| 8,447,292 | B2 | * | 5/2013  | Chari et al. ................... 455/424 |
| 2003/0096610 | A1 |  | 5/2003  | Courtney et al. |
| 2008/0240029 | A1 |  | 10/2008 | Lynch et al. |
| 2009/0076665 | A1 | * | 3/2009  | Hoisington et al. .............. 701/2 |
| 2010/0142454 | A1 | * | 6/2010  | Chang ............................ 370/329 |

(Continued)

OTHER PUBLICATIONS

Sentel Corporation—Engineering Services, Test and Evaluation, Chemical / Biological Detection Systems, Software, http://www.sentel.com/services/es_eng/spectrum_management_tools.html, accessed on Aug. 24, 2011.

(Continued)

*Primary Examiner* — Edward Urban
*Assistant Examiner* — Ralph H Justus
(74) *Attorney, Agent, or Firm* — Philip J. Feig

(57) ABSTRACT

Various embodiments of the present invention relate to wireless network management. One specific example relates to efficient radio frequency (RF) spectrum management involving multiple mobile vehicles, whereby a system and/or a method of the invention achieves greatly improved spectral efficiency in the assignment of frequency bands to communications channels between the vehicles and/or stationary ground stations. Other examples of the present invention provide systems and methods to analyze the RF emissions resulting from the motion of transmitters and/or receivers through airspace with the help of five-dimensional quanta of space (x, y, z), time and frequency to assign frequency bands to test plans (including previously-validated test plan(s) and/or to-be-validated test plan(s)). In one specific example, the analysis is directed to the assignment of frequency bands with and without reuse.

44 Claims, 7 Drawing Sheets

(56) References Cited

U.S. PATENT DOCUMENTS

| | | | |
|---|---|---|---|
| 2011/0134878 A1 | 6/2011 | Geiger | |
| 2011/0228689 A1* | 9/2011 | Wu et al. | 370/252 |
| 2011/0231302 A1* | 9/2011 | Stanforth et al. | 705/37 |
| 2011/0250915 A1* | 10/2011 | Stanforth et al. | 455/509 |
| 2012/0231825 A1* | 9/2012 | Gossain et al. | 455/509 |

OTHER PUBLICATIONS

Hensler, T.C., "Spectrum Management Using JSMSw," Paper presented at the RTO IST Symposium on "Frequency Assignment, Sharing and Conservation in Systems (Aerospace)," Aalborg, Denmark, Oct. 5-7, 1998, published in RTO MP-13.

Kannappa, Investigation of Dynamic Spectrum Assignment Schemes for Cognitive Wireless Networks and Reduced Complexity Equalization Techniques in Aeronautical Telemetry Channels. Dec. 2010. Retrieved from ProQuest Dissertations and Theses: <URL: http://search.proquest.com/docview/851128393/13AF6D5050F4A5CC890/4?accountid=142944>. pp. 1-64.

International Application No. PCT/US2012/035791—PCT International Search Report dated Dec. 10, 2012.

\* cited by examiner

SYSTEMS AND METHODS FOR EFFICIENT RADIO FREQUENCY SPECTRUM MANAGEMENT IN A SCENARIO INVOLVING MULTIPLE MOBILE VEHICLES

CROSS-REFERENCE TO RELATED APPLICATIONS

This application claims the benefit under 35 U.S.C. §119(e) of U.S. Provisional Application Ser. No. 61/481,395, filed May 2, 2011. The entire contents and disclosure of the aforementioned provisional application is incorporated by reference as if fully set forth herein.

STATEMENT REGARDING FEDERALLY SPONSORED RESEARCH OR DEVELOPMENT

This invention was made with Government support under W900KK-10-C-0004 awarded by the US Army. The Government has certain rights in this invention.

BACKGROUND OF THE INVENTION

1. Field of the Invention

Various embodiments of the present invention relate to wireless network management. One specific example relates to efficient radio frequency (RF) spectrum management involving multiple mobile vehicles.

Other examples of the present invention provide systems and methods to analyze the RF emissions resulting from the motion of transmitters and/or receivers through airspace with the help of five-dimensional quanta of space (x, y, z), time and frequency to assign frequency bands to test plans (including previously-validated test plan(s) and/or to-be-validated test plan(s)). In one specific example, the analysis is directed to the assignment of frequency bands with and without reuse.

2. Description of Related Art

The Department of Defense ("DoD") runs a number of "test ranges" across the country. These are air fields or the like at which vehicles (typically new models), such as aircraft and/or ground vehicles, are tested while in motion. Telemetry data is typically continuously streamed from the vehicles to "ground stations" over wireless communication channels during the course of a test.

The wireless spectrum required to support the telemetry communication channels in the airspace over the test ranges is a resource for which there is a great deal of contention. For example: bandwidth needs for each test are typically expanding; the number of tests per day to be scheduled at a given test range is typically increasing; and/or the popularity of smart cellular phones has caused contention by commercial entities for the spectrum bands that were previously designated for telemetry.

In one conventional technique, spectrum de-confliction is approached with spatial allocations of the right to transmit, and with gross approximations. This approach attempts to compensate for the inherent difficulty of making fine-grained spectrum assignments simultaneously in the space, time and frequency domains. However, the result of this approach is that huge amounts of spectrum are typically wasted.

For example, at the most approximate level, a user (typically an enterprise) could be awarded "use of the upper L Band, from 1735-1855 MHz". This implies that the time dimension is approximated to perpetuity. There could be long periods when the user does not transmit at all, when the spectrum could potentially be put to better use. The space dimension too is typically approximated to all space being controlled. There would be many parts of space where no one is transmitting at that frequency at many different times—and where the same spectrum could potentially be put to better use.

In another conventional technique, a frequency manager at a test range manually plans spectrum for an upcoming test by designating a "flight area"—a volume of airspace surrounding the flight path of a test article—and maintaining a reservations calendar for it (giving the frequency manager a right to transmit at certain frequencies in pre-allocated blocks of space for pre-designated blocks of time). The calendar is typically posted at a web-site, which can typically be accessed by other frequency managers.

There are a number of down-sides to this technique.

One downside is that the space allocation is approximated to a "flight-area" surrounding a test range. This is an unnecessarily large space. A transmitter, assigned a certain frequency, may in reality be only transmitting in one part of the airspace. The spectrum in the rest of the space is thus typically wasted.

Another downside is that the space allocation also presents problems at the boundaries. If a transmitter is close to a boundary, although it is emitting from within the flight area, the emission could leak into an adjacent space where it could cause interference. This then necessitates a "guard space" surrounding the space allocation, which leads to further wastage of potential spectrum (already, there is concern that frequency de-confliction needs to occur between test ranges that are close to each other).

Another downside is that the technique typically precludes frequency reuse. There may be multiple opportunities for transmitters to transmit at the same frequency in different parts of the airspace without interfering with one another. This is especially true when directional antennas are employed. These opportunities for frequency reuse are typically wasted with this technique.

Another downside is that the time allocation is a gross approximation, typically 24 hours allocated to a test. This compensates for the uncertainty surrounding the take-off times of flights within the test plan. However, if an aircraft is going to be in the air for only part of the time during a test and it is assigned a certain frequency, that frequency could be used while the aircraft is not in the air.

Another downside is that the gross time allocation also attempts to compensate for the 'lateness' of an aircraft. Because it is not guaranteed that an aircraft will take off on time, a large time-buffer is typically allotted in case it takes off late. Since the aircraft's lateness is not bounded in any real sense, potential spectrum is wasted.

Another downside is that the technique does not typically make use of the flight plan information of a test article. A slow-moving aircraft could traverse a long flight corridor. Spectrum is reserved through the entire corridor. But, in reality, once the aircraft finishes traversing a portion of the flight corridor, the spectrum in that part could potentially be used for other purposes.

Finally, another downside is that the technique typically restricts the airspace management scope of the system to certain flight areas. But, in practice, this poses unnecessary constraints. With crowding, airspace boundaries may need to change fluidly to exploit opportunities for testing. New flight corridors may open up for flying tests, while other areas may have to be designated as off-limits, perhaps on a dynamic basis.

As mentioned, because of the complexity of reserving frequency bands for different volumes of airspace over time, and the potential cost of making a mistake, the conventional reservations calendar technique tends not to be very granular. Available frequency bands are typically missed, because of a natural tendency to schedule an important test in isolation, with "nothing else going on".

Further, there is typically an imprecise characterization of "lateness", the possibility that a test article may embark on its flight path later than the scheduled time (e.g., due to unforeseen events). As a consequence, the guard time intervals between tests tends to be unduly large, causing a wastage of available spectrum. If the test involves, for example, a slow-moving craft covering a long flight path, the typical tendency is to reserve airspace along the entire flight path, rather than free up for other tests the airspace that has already been traversed.

Another conventional technique implements frequency reuse with spatial allocations. In this technique, the airspace is divided up into blocks. Transmitters in non-adjacent blocks are allowed to transmit at the same frequency. This approach also suffers from the fact that the blocks are gross approximations. The opportunities for transmission or reception with directional antennas within the same block are wasted. Knowledge of flight paths through the blocks is not used. Frequency reuse blocks may necessitate switching frequencies at block boundaries—an added problem.

Further, conventional spectrum planning systems, such as "Spectrum Management Tools" by Sentel Corporation, are available.

Of note, the idea of making hypothetical frequency assignments to RF devices, then performing a worst-case analysis of the resulting emissions has heretofore been considered too complex and too imbued with uncertainty to attempt.

SUMMARY OF THE INVENTION

Various embodiments of the present invention deconstruct the complexity associated with making hypothetical frequency assignments to RF devices, then performing a worst-case analysis of the resulting emissions by utilizing a detailed object-oriented database of predicted RF emissions and bounding the uncertainty, permitting a worst-case analysis.

Various embodiments of the present invention provide a tool, such as for use by a frequency manager, with one or more of the following capabilities: (a) increase the precision with which the airspace affected by the flight plans of test articles may be reserved for particular frequency bands in upcoming tests; (b) bound the uncertainty of a test article's position caused by the test article's potential lateness, allowing optimal usage of spectrum (accounting for the reality that test articles may be launched late); (c) automatically generate frequency band assignments from a pool of available frequencies for the wireless communication channels associated with upcoming tests; (d) store test plans and spectrum reservations in a central database that allows the frequency managers at multiple test ranges to plan collaboratively; (e) determine a frequency band that may be assigned with reuse (in the event that no frequency band is available for a given wireless communication channel; (f) verify RF propagation for a given wireless communication channel over the flight path of an associated test article; and/or (g) determine an optimal time when a test plan should be re-scheduled (in the event that frequency bands cannot be assigned to a given wireless communication channel of a test plan even with reuse).

In one embodiment a method implemented by one or more computers is provided. The method of this embodiment includes creating a plan of frequency band assignments to radio frequency (RF) communication channels between a set of one or more test articles expected to be moving through three-dimensional space in the future and a set of one or more mobile or stationary ground stations, wherein a future scenario consisting of at least one mobile test article and at least one ground station is grouped into a test plan, wherein the process of assigning frequency bands to the communication channels between the at least one mobile test article and the at least one ground station is a validation, and wherein information, including one or more frequency assignments associated with one or more test plans that have already been validated, reside in at least one storage device (e.g., one or more computer memories and/or one or more databases).

The method of this embodiment further includes: (a) associating knowledge of a respective flight plan with each test article, wherein each flight plan comprises a route that the test article is expected to fly along, or a designation of a polyhedron of airspace within which the test article is expected to fly; (b) associating knowledge of a respective ground route with each ground station, wherein each ground route comprises a route that the ground station is expected to follow, or an area within which the ground station is confined, or a fixed location where a stationary ground station is positioned; (c) accounting for any test article commencing its flight plan late by an unpredicatable time interval and any ground station commencing its ground route late by an upredictable time interval with a respective maximum lateness attribute, wherein the associated test plan is expected to be cancelled or re-planned if its commencement is delayed beyond the maximum lateness; (d) quantizing the totality of the airspace through which each test article is expected to travel and the totality of the ground area that each ground station is expected to traverse into spectrum bins, which are fixed-sized quanta of airspace, each at a fixed location over or on the surface of the earth; (e) quantizing the maximum time interval that each test article may exist inside a spectrum bin, as a function of its flight plan and its maximum lateness, and that each ground station may exist inside a bin as a function of its ground route and its maximum lateness with a track element, associated with each bin traversed; (f) from each track element, deriving a transmit track element for each transmitter inside a test article or a ground station that is associated with a given channel, and a receive track element for each receiver inside a test article or a ground station that is associated with the given channel; (g) for each channel in a test plan currently being validated, first attempting to assign a frequency band that is unused over the maximum time interval that the channel is expected to exist, accounting for respective maximum lateness attributes of each respective test article and each respective ground station, and, failing this attempt, attempting to make an assignment with frequency reuse.

In the method of this embodiment, a testing to determine assignment with reuse includes: (i) determining the optimal reused frequency band to assign to the present channel by evaluating, in turn, each potentially reusable frequency band in a totality of an available spectrum for the channel quality each potentially reusable frequency band provides while not degrading below a respective acceptable threshold the quality of any other time-coincident and frequency-coincident channel belonging to a previously-validated test plan, (1) wherein channel quality is calculated by taking the mean, weighted by bin size, of each signal-to-interference-and-noise ratio (SINR) experienced by each receive track element belonging to the present channel, and (2) wherein potential degradation of each previously-validated channel is determined by re-calculating the channel quality of the previously-validated channel, taking into account any additional interfering emissions from each transmit track element of the present channel, and rejecting the potential reused frequency assignment if the quality of the previously-validated channel falls below an acceptable threshold, and (ii) assigning the optimal reused frequency band to the present channel; and (h) storing each frequency band assignment of the test plan currently being validated, once completed, along with each track element, each emission and each channel quality evaluation in the at least one storage device, to be used in subsequent test plan validation(s) where at least one channel of the test plan currently being validated is time-coincident and frequency-coincident with at least one channel of a test plan subsequently being validated.

In one example, the time-coincidence may be at least partially overlapping. In another example, the time-coincidence may be fully overlapping. In one example, the frequency-coincidence may be at least partially overlapping. In another example, the frequency-coincidence may be fully overlapping.

In one example, each test article and/or each gound station may have associated therewith a respective maximum lateness attribute. In another example, one group of test articles and/or gound stations may have associated therewith a respective maximum lateness attribute and another group of test articles and/or gound stations may have associated therewith a respective maximum lateness attribute. In another example, a global maximum lateness attribute may be associated with each test article and each gound station.

In another embodiment, an article of manufacture is provided. The article of manufacture of this embodiment includes at least one tangible computer readable device having a computer readable program code logic tangibly embodied therein to execute at least one machine instruction in at least one processing unit for creating a plan of frequency band assignments to radio frequency (RF) communication channels between a set of one or more test articles expected to be moving through three-dimensional space in the future and a set of one or more mobile or stationary ground stations, wherein a future scenario consisting of at least one mobile test article and at least one ground station is grouped into a test plan, wherein the process of assigning frequency bands to the communication channels between the at least one mobile test article and the at least one ground station is a validation, and wherein information, including one or more frequency assignments associated with one or more test plans that have already been validated, reside in at least one storage device (e.g., one or more computer memories and/or one or more databases).

In the article of manufacture of this embodiment, the computer readable program code logic, when executing, performs the following steps: (a) associating knowledge of a respective flight plan with each test article, wherein each flight plan comprises a route that the test article is expected to fly along, or a designation of a polyhedron of airspace within which the test article is expected to fly; (b) associating knowledge of a respective ground route with each ground station, wherein each ground route comprises a route that the ground station is expected to follow, or an area within which the ground station is confined, or a fixed location where a stationary ground station is positioned; (c) accounting for any test article commencing its flight plan late by an unpredicatable time interval and any ground station commencing its ground route late by an upredictable time interval with a respective maximum lateness attribute, wherein the associated test plan is expected to be cancelled or re-planned if its commencement is delayed beyond the maximum lateness; (d) quantizing the totality of the airspace through which each test article is expected to travel and the totality of the ground area that each ground station is expected to traverse into spectrum bins, which are fixed-sized quanta of airspace, each at a fixed location over or on the surface of the earth; (e) quantizing the maximum time interval that each test article may exist inside a spectrum bin, as a function of its flight plan and its maximum lateness, and that each ground station may exist inside a bin as a function of its ground route and its maximum lateness with a track element, associated with each bin traversed; (f) from each track element, deriving a transmit track element for each transmitter inside a test article or a ground station that is associated with a given channel, and a receive track element for each receiver inside a test article or a ground station that is associated with the given channel; (g) for each channel in a test plan currently being validated, first attempting to assign a frequency band that is unused over the maximum time interval that the channel is expected to exist, accounting for respective maximum lateness attributes of each respective test article and each respective ground station, and, failing this attempt, attempting to make an assignment with frequency reuse.

In the article of manufacture of this embodiment a testing to determine assignment with reuse includes: (i) determining the optimal reused frequency band to assign to the present channel by evaluating, in turn, each potentially reusable frequency band in a totality of an available spectrum for the channel quality each potentially reusable frequency band provides while not degrading below a respective acceptable threshold the quality of any other time-coincident and frequency-coincident channel belonging to a previously-validated test plan, (1) wherein channel quality is calculated by taking the mean, weighted by bin size, of each signal-to-interference-and-noise ratio (SINR) experienced by each receive track element belonging to the present channel, and (2) wherein potential degradation of each previously-validated channel is determined by re-calculating the channel quality of the previously-validated channel, taking into account any additional interfering emissions from each transmit track element of the present channel, and rejecting the potential reused frequency assignment if the quality of the previously-validated channel falls below an acceptable threshold, and (ii) assigning the optimal reused frequency band to the present channel; and (h) storing each frequency band assignment of the test plan currently being validated, once completed, along with each track element, each emission and each channel quality evaluation in the at least one storage device, to be used in subsequent test plan validation(s) where at least one channel of the test plan currently being validated is time-coincident and frequency-coincident with at least one channel of a test plan subsequently being validated.

In one example, the time-coincidence may be at least partially overlapping. In another example, the time-coincidence may be fully overlapping. In one example, the frequency-coincidence may be at least partially overlapping. In another example, the frequency-coincidence may be fully overlapping.

In one example, each test article and/or each gound station may have associated therewith a respective maximum lateness attribute. In another example, one group of test articles and/or gound stations may have associated therewith a respective maximum lateness attribute and another group of test articles and/or gound stations may have associated therewith a respective maximum lateness attribute. In another example, a global maximum lateness attribute may be associated with each test article and each gound station.

In another embodiment a system is provided. The system of this embodiment is for creating a plan of frequency band assignments to radio frequency (RF) communication channels between a set of one or more test articles expected to be moving through three-dimensional space in the future and a set of one or more mobile or stationary ground stations, wherein a future scenario consisting of at least one mobile test article and at least one ground station is grouped into a test plan, wherein the process of assigning frequency bands to the communication channels between the at least one mobile test article and the at least one ground station is a validation, and wherein information, including one or more frequency assignments associated with one or more test plans that have already been validated, reside in at least one storage device of the system (e.g., one or more computer memories and/or one or more databases).

The system of this embodiment includes at least one processor unit configured for: (a) associating knowledge of a respective flight plan with each test article, wherein each flight plan comprises a route that the test article is expected to fly along, or a designation of a polyhedron of airspace within which the test article is expected to fly; (b) associating knowledge of a respective ground route with each ground station, wherein each ground route comprises a route that the ground station is expected to follow, or an area within which the ground station is confined, or a fixed location where a stationary ground station is positioned; (c) accounting for any test article commencing its flight plan late by an unpredicatable time interval and any ground station commencing its ground route late by an upredictable time interval with a respective maximum lateness attribute, wherein the associated test plan is expected to be cancelled or re-planned if its commencement is delayed beyond the maximum lateness; (d) quantizing the totality of the airspace through which each test article is expected to travel and the totality of the ground area that each ground station is expected to traverse into spectrum bins, which are fixed-sized quanta of airspace, each at a fixed location over or on the surface of the earth; (e) quantizing the maximum time interval that each test article may exist inside a spectrum bin, as a function of its flight plan and its maximum lateness, and that each ground station may exist inside a bin as a function of its ground route and its maximum lateness with a track element, associated with each bin traversed; (f) from each track element, deriving a transmit track element for each transmitter inside a test article or a ground station that is associated with a given channel, and a receive track element for each receiver inside a test article or a ground station that is associated with the given channel; (g) for each channel in a test plan currently being validated, first attempting to assign a frequency band that is unused over the maximum time interval that the channel is expected to exist, accounting for respective maximum lateness attributes of each respective test article and each respective ground station, and, failing this attempt, attempting to make an assignment with frequency reuse.

In the system of this embodiment a testing to determine assignment with reuse includes: (i) determining the optimal reused frequency band to assign to the present channel by evaluating, in turn, each potentially reusable frequency band in a totality of an available spectrum for the channel quality each potentially reusable frequency band provides while not degrading below a respective acceptable threshold the quality of any other time-coincident and frequency-coincident channel belonging to a previously-validated test plan, (1) wherein channel quality is calculated by taking the mean, weighted by bin size, of each signal-to-interference-and-noise ratio (SINR) experienced by each receive track element belonging to the present channel, and (2) wherein potential degradation of each previously-validated channel is determined by re-calculating the channel quality of the previously-validated channel, taking into account any additional interfering emissions from each transmit track element of the present channel, and rejecting the potential reused frequency assignment if the quality of the previously-validated channel falls below an acceptable threshold, and (ii) assigning the optimal reused frequency band to the present channel; and (h) storing each frequency band assignment of the test plan currently being validated, once completed, along with each track element, each emission and each channel quality evaluation in the at least one storage device, to be used in subsequent test plan validation(s) where at least one channel of the test plan currently being validated is time-coincident and frequency-coincident with at least one channel of a test plan subsequently being validated.

In one example, the time-coincidence may be at least partially overlapping. In another example, the time-coincidence may be fully overlapping. In one example, the frequency-coincidence may be at least partially overlapping. In another example, the frequency-coincidence may be fully overlapping.

In one example, each test article and/or each gound station may have associated therewith a respective maximum lateness attribute. In another example, one group of test articles and/or gound stations may have associated therewith a respective maximum lateness attribute and another group of test articles and/or gound stations may have associated therewith a respective maximum lateness attribute. In another example, a global maximum lateness attribute may be associated with each test article and each gound station.

BRIEF DESCRIPTION OF THE DRAWINGS

The drawings are provided for illustrative purpose only and do not necessarily represent practical examples of the present invention to scale. In the figures, same reference signs are used to denote the same or like parts.

DETAILED DESCRIPTION OF THE INVENTION

Figure 1:
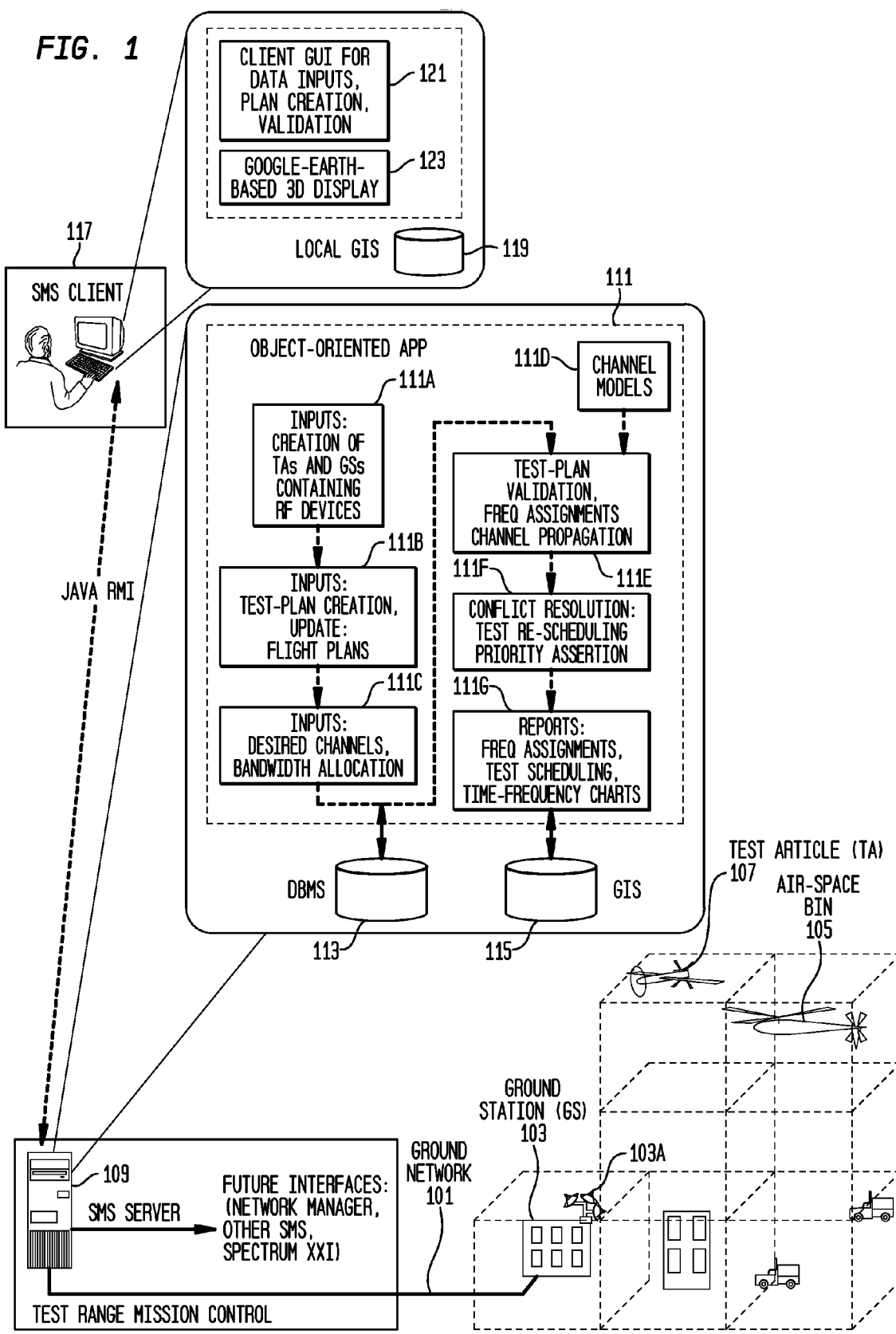
FIG. 1 is a block diagram of a system according to one embodiment of the present invention (this Fig. shows a central object-oriented application/database at a test range, with the capability to support multiple clients)

For the purposes of describing and claiming the present invention, the term "vehicle" is intended to refer to: (a) an aerospace vehicle (e.g., an airplane or a space vehicle); (b) a ground vehicle (e.g., a wheeled vehicle or a tracked vehicle); and/or (c) a water vehicle (e.g., a boat, a ship or a submarine).

For the purposes of describing and claiming the present invention, the term "test article" is intended to refer to a vehicle (as defined herein) that has associated therewith at least one transmitter or receiver communicating with another test article or a ground station via a communications channel.

For the purposes of describing and claiming the present invention, the term "ground station" is intended to refer to: (a) a vehicle (as defined herein) that has associated therewith at least one transmitter or receiver communicating with a test article or another ground station via a communications channel; or (b) a shelter that has associated therewith at least one transmitter or receiver communicating with a test article or another ground station via a communications channel. A ground station may be stationary on the earth's surface, or may be in motion (wherein such motion is restricted to being essentially on (and essentially not above) the earth's surface.

For the purposes of describing and claiming the present invention, the term "airspace" is intended to refer to the space generally above a location on the earth. In one example, airspace may extend down all the way to the "ground" (e.g., land or the surface of a body of water). In another example, airspace may extend down through a body of water (e.g., an ocean, sea, bay or lake) all the way down to bottom of the body of water. In another example, airspace may extend upward a fixed amount. In another example, airspace may extend upward indefinitely.

For the purposes of describing and claiming the present invention, the term "flight plan" is intended to refer to a planned movement through an airspace. In one example, a flight plan may apply to an aerospace vehicle (e.g., an airplane or a space vehicle). In another example, a flight plan may apply to a ground vehicle (e.g., a wheeled vehicle or a tracked vehicle). In another example, a flight plan may apply to a water vehicle (e.g., a boat, a ship or a submarine).

For the purposes of describing and claiming the present invention, the term "ground route" is intended to refer to a planned movement through an airspace, wherein the motion is restricted to being that of a ground station traveling essentially on (and essentially not above) the earth's surface.

For the purposes of describing and claiming the present invention, the term "reuse" (or "frequency reuse") is intended to refer to using a given frequency (or range of frequencies) concurrently at two or more different locations in a single airspace (as long as the distance between the locations is large enough to essentially obviate the possibility of radio frequency interference).

For the purposes of describing and claiming the present invention, the term "frequency band" is intended to refer to a range of frequencies or a single discrete frequency.

For the purposes of describing and claiming the present invention, the term "quantum of space, time and frequency" is intended to refer to a given point (or region) in an airspace at a given time (a given instant of time or a given span of time) at a given frequency (a single frequency or a given frequency range).

For the purposes of describing and claiming the present invention, the term "object" is intended to refer to a software object in the sense of "object-oriented" programming.

Referring now to FIG. 1, an embodiment of the present invention as applied in the context of a flight test range is shown. This example comprises a ground network 101, including ground station 103. The ground station 103 includes antenna element 103A and radio frequency (RF) devices, which function as network elements and stream telemetry or other data to and from sensors, recorders or other types of network-connected devices. Further, the airspace is divided into a plurality of airspace "bins." One of these bins—bin 105—is separately called out in this Fig. (of course, any desired number of bins may be used). Test article 107 travels through the airspace bins as testing progresses (of course, any desired number of test articles may be used). Test article 107 includes antenna element and radio frequency (RE) devices, which function as network elements and stream telemetry or other data to and from sensors, recorders or other types of network-connected devices.

Still referring to FIG. 1, it is seen that the computer 109 is a server (e.g., a Spectrum Management System (SMS) server) in a client-server system, located at a test range. Server 109 has associated therewith software application 111. In one example, software application 111 is an object-oriented application. Further, software application 111 operatively communicates with database 113 (e.g., MySQL DBMS) and GIS 115 (geographic information system).

Still referring to FIG. 1, it is seen that software application 111 receives the following inputs: inputs 111A related to creation of test articles, ground stations and containing RF devices; inputs 111B related to test plan creation/updates and flight plans; and inputs 111C related to desired wireless communication channels, and bandwidth allocation. Further, inputs 111A, 111B and 111C (as well as wireless communication channel models 111D) are received by module 111E, which performs test plan validation, frequency band assignments and channel propagation testing/analysis. Further still, module 111F receives output from module 111E and performs conflict resolution: test re-scheduling, and priority assertion. Further still, module 111G receives output from module 111F and performs reporting, including frequency band assignments, test scheduling, and time-frequency charts.

Still referring to FIG. 1, it is seen that remote client computer 117 (e.g., a Spectrum Management System (SMS) client computer) at which a user may be logged in is provided (of course, any desired number of client computers may be used by any desired number of users). Each user of the system may create, edit, view and/or validate test plans, via a graphical user interface (GUI) at each client computer. Client computer 117 operatively communicates with server 109 (e.g., via Java remote method invocation (RMI)). Further, client computer 117 operatively communicates with local GIS 119 (geographic information system). Further still, client computer 117 includes client GUI 121 (graphical user interface) for data inputs, test plan creation, and validation. In addition, client machine 117 includes a Google Earth based 3-D display 123.

Figure 2:
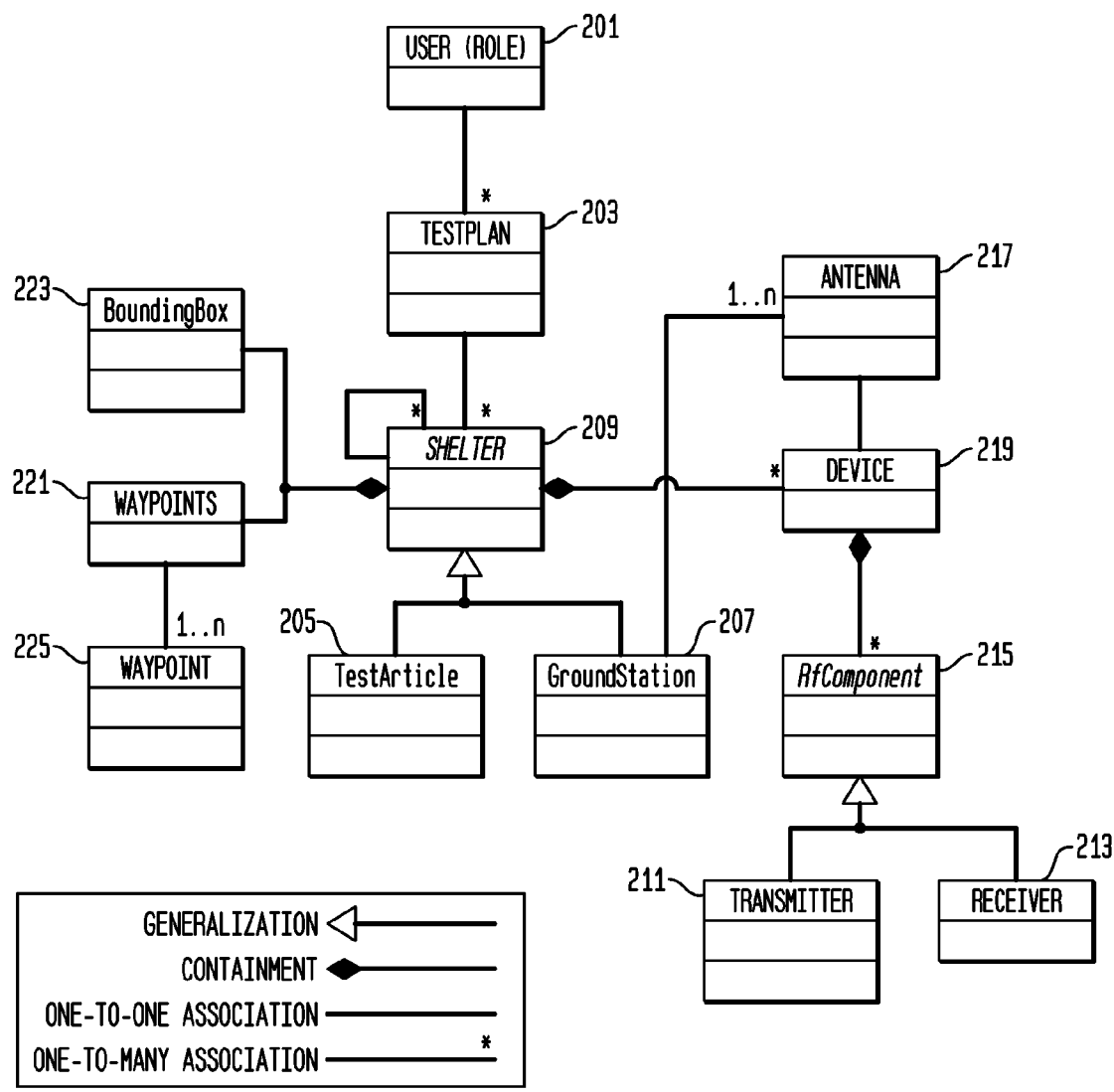
FIG. 2 is a system class diagram according to another embodiment of the present invention.

Referring now to FIG. 2, this Fig. illustrates a first portion of an example class model of a system's object-oriented database, using a Universal Modeling Language (UML) representation.

A "User" object in the database represents information related to a user who is allowed to use the system to manage spectrum. FIG. 2 shows one such object, identified as User 201. A user may create and "own" one or more test plans. Each test plan creation by the user results in the instantiation of a new "TestPlan" object. FIG. 2 shows one such object, identified as TestPlan 203. A user must include one or more "Test Article" objects and one or more "Ground Station" objects in each Test Plan. FIG. 2 shows one of each of these objects, identified as TestArticle 205 and GroundStation 207. TestArticles and GroundStations have a lot in common. Both are containers of radio frequency (RF) devices. Both participate in tests. The abstract super-class "Shelter" (one of which is shown in FIG. 2 as Shelter 209) captures the common attributes of TestArticles and GroundStations.

Each Shelter contains one or more RF "Device" objects. Each Device contains one or more "Transmitter" objects and/or one or more "Receiver" objects. FIG. 2 shows one of each of these objects, identified as Transmitter 211 and Receiver 213. Since Transmitters and Receivers have attributes in common, these are captured in a super-class, RfComponent (shown in FIG. 2 as RfComponent 215).

Each TestArticle and/or GroundStation may have one or more "Antenna" objects (in one example, these may be tracking antennas). FIG. 2 shows one such object, identified as Antenna 217. Each Antenna may be associated with one or more "Device" objects in the TestArticle and/or GroundStation for a particular TestPlan. FIG. 2 shows one such Device object, identified as Device 219.

Having created and equipped TestArticles and GroundStations for inclusion in a TestPlan, the User needs to specify a flight plan for each of the TestArticles and GroundStations.

A flight plan is represented in this example database as either a sequence of "Waypoints" (see Waypoints 221 of FIG. 2) or a "BoundingBox" (see BoundingBox 223 of FIG. 2). The sequence of Waypoints consists of individual Waypoint objects (one of which is shown in FIG. 2 as Waypoint 225). Each of the individual Waypoint objects provides: latitude, longitude, elevation, the time spent waiting at the Waypoint (which may be zero), and the speed from the current Waypoint to the next Waypoint. A BoundingBox describes a volume of space within which a TestArticle may be assumed to fly anywhere between a start time and an end time. The BoundingBox provides: start and end time, west longitude, east longitude, south latitude, north latitude, minimum elevation, maximum elevation.

A GroundStation may be stationary or mobile during a test. If stationary, its location is specified by a fixed latitude, longitude and elevation. If mobile, its path is described by a ground-based route, which may be specified as a set of Waypoints or an area on the ground within which the GroundStation is confined.

Figure 3:
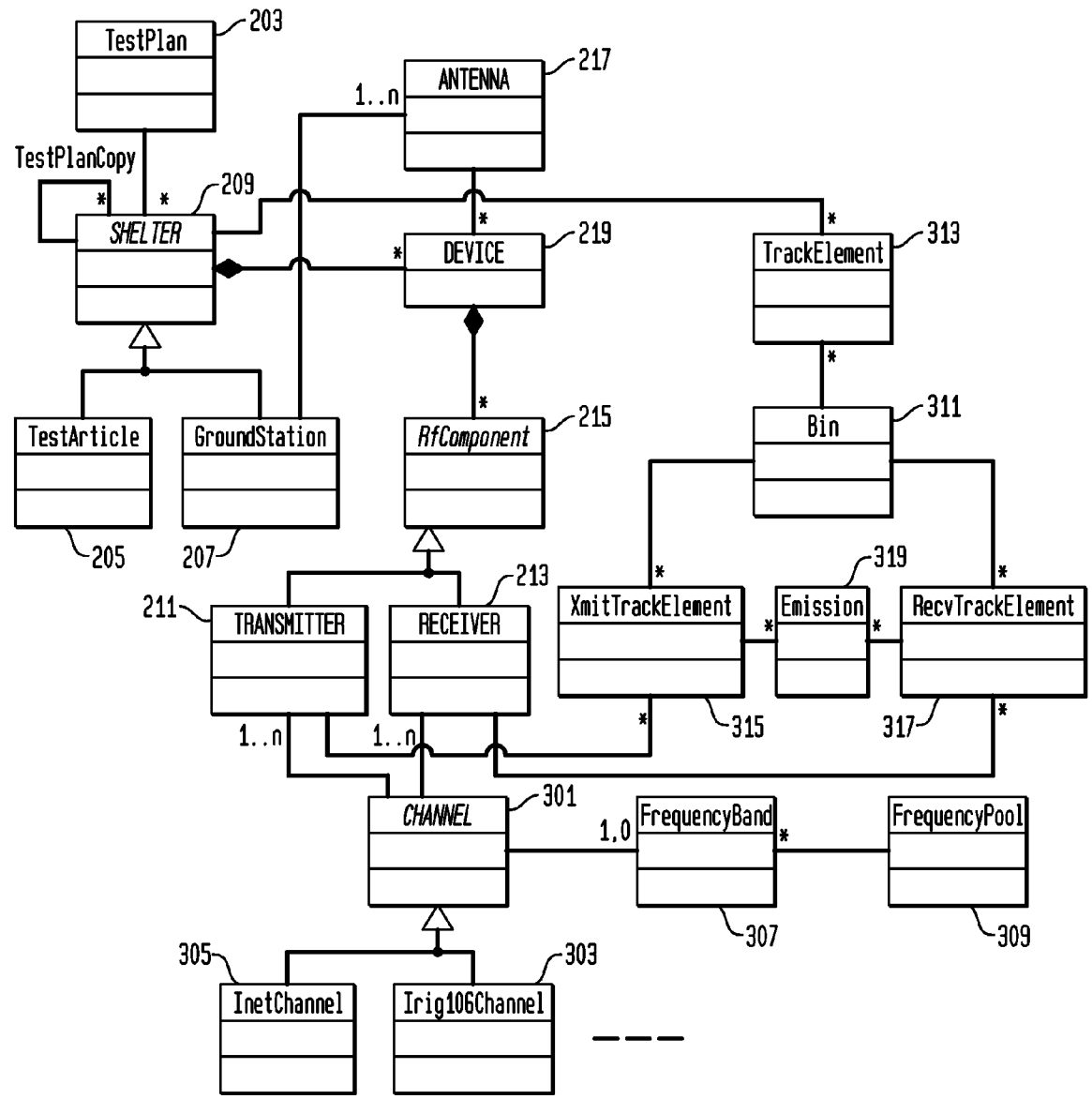
FIG. 3 is a system class diagram according to another embodiment of the present invention.

Referring now to FIG. 3, this figure illustrates an additional portion (along with a portion of what is shown in FIG. 2) of the example class model of a system's object-oriented database. More particularly, the User may request one or more wireless communications "Channels" (one of which is shown in FIG. 3 as Channel 301) between each TestArticle and Ground Station in a TestPlan. Channel may be sub-classed into different types of Channels, each with specific frequency band needs. In this example, an "Irig106Channel" type (a Channel supporting the IRIG-106 telemetry protocol—shown in FIG. 3 as Irig106Channel 303) and an "InetChannel" type (a Channel following the iNET protocol—shown in FIG. 3 as InetChannel 305) are provided (of course, any desired number and/or types of channels may be used). In one specific example, an Irig106Channel must have one transmitter in a TestArticle and one or more receivers in multiple GroundStations.

In the example of FIG. 3, the validation process for a TestPlan attempts to assign a "FreqBand" (frequency band) to each Channel in the TestPlan. FIG. 3 shows one such object, identified as FreqBand 307. An available FreqBand object is obtained by requesting the singleton "FreqPool" (frequency pool) object, which keeps the pool of available frequencies. FIG. 3 shows this singleton object, identified as FreqPool 309. A FreqBand assigned to a Channel is considered to be occupied for the time interval of the Channel, after which the FreqBand is "returned" to the FreqPool.

If a FreqBand is not available for the time interval of the Channel, the validation process can request FreqPool to provide a FreqBand with frequency reuse. It is up to the validation process to determine if the provided FreqBand is actually reusable, with adequate quality for the current Channel and the Channels being interfered with. If the provided FreqBand is not reusable, the validation process makes another request, and FreqPool provides the next FreqBand in the test range spectrum (with the validation process iteratively determining actual reusability).

In order to calculate predicted RF emissions at various points in the airspace, the system divides up the airspace into spectrum "Bins". FIG. 3 shows this class, identified as Bin 311. In this example, a Bin is a minimum-sized quantum of airspace at a fixed location, within which the system assumes all RF emissions to be uniform. An example of a technique to define Bin instances is as follows: Let a minimum-sized Bin have the dimensions: 1 minute along a latitude line×1 minute along a longitude line×2000 meters of altitude. Let the position of each Bin instance be determined by the position of its bottom south-west corner, which is always on a latitude and longitude minute-boundary, at a height that is a multiple of 2000 meters.

A TestArticle may not start its movement along a flight plan exactly on time As a result it is difficult to say exactly where the TestArticle will be at a given instance in time during the test. In this example, a "maximum lateness" attribute in a TestPlan specifies the maximum period of time by which a TestArticle, may start late. To track the airspace that a TestArticle flies through, the system of this example generates a sequence of "TrackElements" for each TestArticle. FIG. 3 shows this class, identified as TrackElement 313. Each TrackElement has a start time and an end time, and is associated with a Bin. A TrackElement expresses the fact that the TestArticle has a non-zero probability of being in the TrackElement's associated Bin between the TrackElement's start time and end time.

For each TestArticle, the system of this example generates a sequence of TrackElements by 'walking' through the flight plan of the TestArticle and computing the earliest time that it is possible for the TestArticle to enter a given Bin (given the TestArticle's flight path and start time) and the latest time it is possible for the TestArticle to leave the Bin (given TestArticle's time of entry, lateness, and current speed).

The system similarly "tracks" a GroundStation by generating a single TrackElement associated with a Bin containing the GroundStation. The start and end times encompass the duration of the test.

To calculate Channel propagation and signal-to-interference-and-noise ratio (SINR), what is really of interest is a sequence of track elements for each specific Transmitter and Receiver. To support this concept, the system of this example generates a sequence of "XmitTrackElements" (transmit track elements) for each Transmitter in the TestArticle or GroundStation and a sequence of "ReevTrackElements" (receive track elements) for each Receiver in the TestArticle or GroundStation. FIG. 3 shows these classes, identified as XmitTrackElement 315 and RecvTrackElement 317. Each XmitTrackElement and RecvTrackElement contains the start time, end time and Bin association, essentially copied from a respective TrackElement object.

For each XmitTrackElement and RecvTrackElement that overlap in time and frequency, the system is capable of calculating the power level of the RF emission that reaches the RecvTrackElement from the XmitTrackElement. The system stores this power level in an "Emission" object. FIG. 3 shows this class, identified as Emission 319. Each Emission object is associated with one XmitTrackElement and one RecvTrackElement. Since in this example the emission power level is always for a particular frequency, each Emission object is also associated with the FreqBand that is currently being considered for assignment to the Channel. The FreqBand acts as a collection object for all the Emissions. Should it not be assigned to the Channel, the FreqBand—and all its Emissions—are removed from consideration.

Reference will now be made to an example validation and frequency band assignment algorithm More particularly, after populating the database as described above with reference to FIGS. 2 and 3, the system now has a basis for: validating TestPlans at a test range; automatically assigning frequency bands to Channels with and without reuse, such that they do not conflict (e.g., conflict such that performance would fall below an acceptable threshold); verifying Channel propagation; and re-scheduling TestPlans into the future if required frequency bands are not available at a proposed time.

In its normal operating state the system has multiple TestArticles, GroundStations, and their contained Devices defined in its database. These TestArticles and GroundStations are potentially usable in a test. The system database would also typically have a number of previously-validated TestPlans. The start times for these previously-validated TestPlans is typically sometime in the future, and their frequency assignments have been de-conflicted. Associated with each TestPlan object in the database are the plan's TestArticle(s), GroundStation(s), flight plan(s), TrackElement(s), Channel definition(s) and computed Emission object(s).

Figure 4:
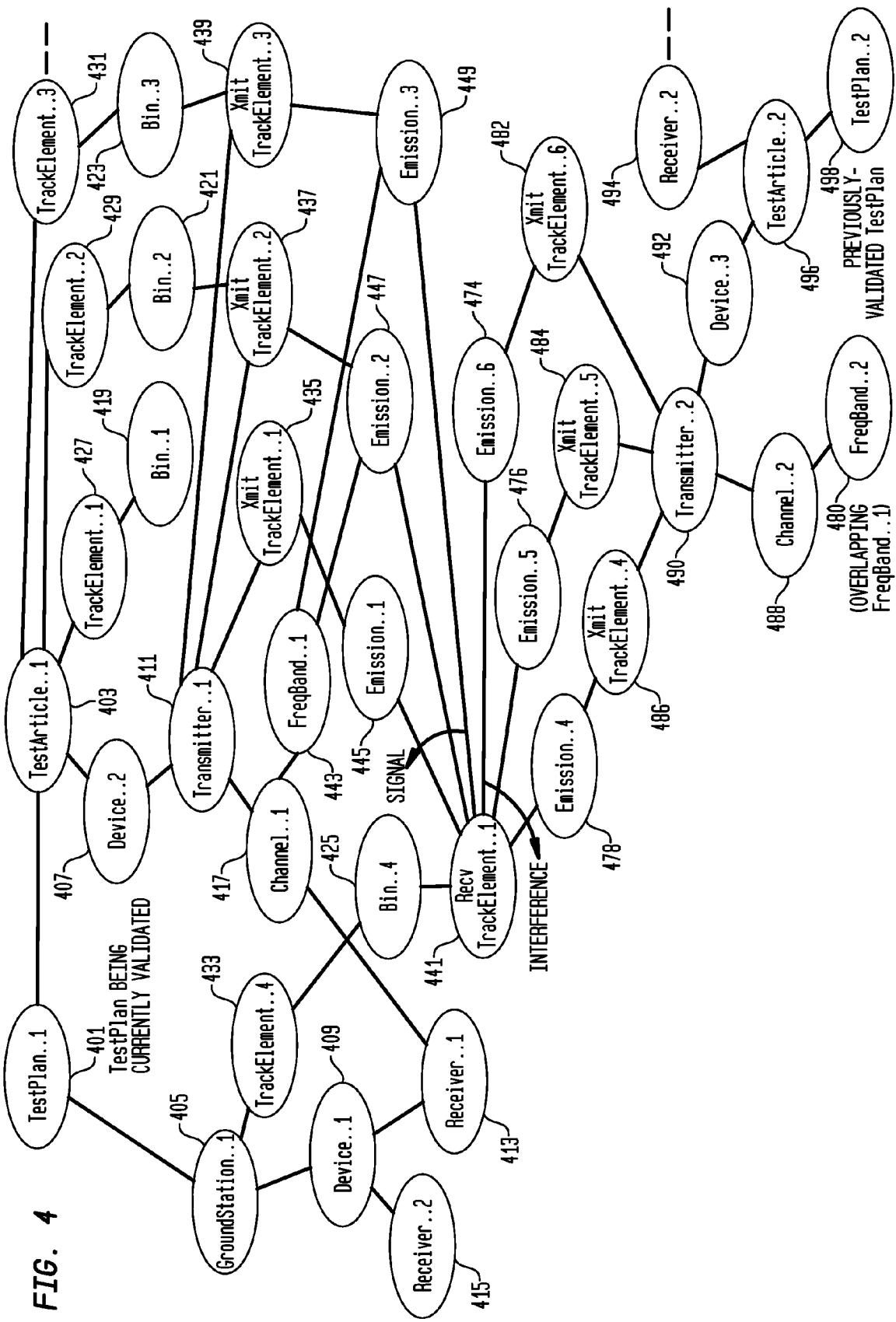
FIG. 4 is an object diagram according to another embodiment of the present invention (this Fig. shows signal and interference at a RecvTrackElement)

Referring now to FIG. 4, an example object instance diagram illustrating a part of a database that is involved with creating and editing a TestPlan (and then validating the TestPlan) is shown.

When a User requests creation of a new test plan, the system instantiates a new TestPlan object in the database (see element 401), with User-set attributes, such as the TestPlan name, desired start time, and options. One option that may be set is whether to have a fixed, User-specified start time for the test, or a flexible start time. With the flexible start time option the system schedules the test at a time when spectrum is available. The chances of a successful TestPlan validation with frequency bands assigned to all Channels are greater with the flexible start time option.

Editing is carried out when the "status" attribute of the TestPlan is set to "editing". The user now includes desired TestArticle(s) and GroundStation(s), available at the test range, into the TestPlan (see elements 403 and 405). For each TestArticle, the User specifies the flight plan, either in terms of a set of Waypoints, or in terms of a BoundingBox. For each GroundStation, the User specifies the location, typically in the form of a single Waypoint, at which the GroundStation "waits" indefinitely.

Inclusion of TestArticle(s) and GroundStation(s) in the TestPlan automatically results in the inclusion of their contained Device(s) (see elements 407 and 409) with their Transmitter(s) (see element 411) and Receiver(s) (see elements 413 and 415). The User now specifies the desired Channel(s) (see element 417) in the TestPlan. For each Channel, the system's GUI causes the User to associate specified Transmitter(s) and Receiver(s) with the Channel, as appropriate to the Channel's waveform.

The TestPlan (see element 401) is now ready to be validated and have frequency bands assigned. The User makes a validation request. The system performs initial checks to ensure that the TestPlan definition is valid. For example, the system verifies that the TestPlan includes at least one TestArticle and at least one GroundStation, with a required Channel definition between them. The system also ensures that for the proposed time-interval of the TestPlan the included TestArticle(s) and GroundStation(s) are not participating in other tests. The system further ensures that the proposed start time of the test is in the future.

Next, the system generates TrackElement(s). For each TestArticle, if the flight plan is expressed with Waypoints: The system traverses the path described by the sequence of Waypoints. The system determines a sequence of the containing spectrum Bins (see elements 419, 421, 423, 425) for each point along the flight plan. For each such containing Bin, the system creates an associated TrackElement (see elements 427, 429, 431, 433). The system determines the "start time" and "end time" attributes of each TrackElement. For the first TrackElement, the start time is the start time of the flight plan of the associated TestArticle. For subsequent TrackElements the start time is the earliest time at which the associated TestArticle enters the associated Bin; that is, the time at which the TestArticle will enter the Bin if movement of the TestArticle starts on time (and is not late). The end time for each TrackElement is the latest possible time at which an associated TestArticle leaves an associated Bin. The end time for each TrackElement is therefore: (The time of entry into the Bin)+(travel time within the Bin)+maximum lateness.

If the TestArticle's flight path is expressed with a BoundingBox (rather than by Waypoints), the system determines all the spectrum Bins that are at least partially contained in the BoundingBox. For each such Bin, the system creates an associated TrackElement. The start time of each TrackElement is the start time of the BoundingBox. The end time of each TrackElement is: (The end time of the BoundingBox)+maximum lateness.

For each stationary GroundStation, the system generates a single containing Bin and an associated TrackElement. The start time of the TrackElement is the start time of the test. The end time of the TrackElement is the end time of the test; that is, the latest projected end time of a TestArticle's movement in the TestPlan (this value includes maximum lateness, as described herein).

For each Transmitter contained in a TestArticle or GroundStation in the test plan, the system now generates an associated sequence of transmit track elements, or XmitTrackElements (see elements 435, 437, 439). The system does this by creating a XmitTrackElement object corresponding to each TrackElement object, and by copying the start and end times.

For each Receiver contained in a TestArticle or GroundStation, the system similarly creates a sequence of receive track elements, or RecvTrackElements (see element 441).

Of note, at least one previously validated TestPlan object (see element 498) would typically reside in the database. Further, such previously validated TestPlan object would have associated therewith, for example the following: TestArticle(s) and/or GroundStation(s) (see element 496); Receiver(s) (see element 494); Device(s) (see element 492); Transmitter(s) (see element 490); Channel(s) (see element 488); and/or XmitTrackElement(s) (see elements 486, 484, and 482).

In any case, the system is now in a position to attempt to assign FreqBands (see element 443) to the Channels of the TestPlan being validated (see, also, the FreqBand associated with the previously validated TestPlan—identified as element 480). For each Channel of the TestPlan being validated, the system determines the start and end time of the Channel. The start time is the earliest of the start times of the XmitTrackElements associated with the Channel. The end time is the latest of the end times of the XmitTrackElements associated with the Channel.

The system first attempts to assign an available frequency band without reuse. This is done by searching the FreqPool (see element 309 of FIG. 3) for a frequency band that is not occupied (by an existing FreqBand object) for the Channel's time interval. If such a band is found, a new FreqBand object is created and assigned to the Channel.

Note that a FreqBand assigned without reuse guarantees that there is no use of that band in the specified time interval through the entire airspace whose spectrum is being managed by the system. In an extensive or crowded airspace this could be a rare event.

If a frequency band cannot be assigned without reuse, the system makes an attempt to assign a frequency band with reuse. The system opens a "session" with the FreqPool object (see element 309 of FIG. 3), to walk through the spectrum managed by the system, requesting frequency bands that are already in use by previously-validated TestPlans. For each such candidate frequency band, the system creates a FreqBand object and hypothetically assigns it to the Channel (see element 443). The system now determines if the Channel will have adequate SINR (signal-to-interference-and-noise ratio) with this assignment. In this regard, for each RecvTrackElement belonging to the Channel:

The system performs a database query to discover all XmitTrackElements that overlap in time and in frequency with the RecvTrackElement. If a given XmitTrackElement belongs to a Transmitter in the same TestArticle or GroundStation as the RecvTrackElement, the given XmitTrackElement is eliminated from the resulting list (in this example the system only cares about RF emissions through the airspace.) For each of the RecvTrackElements remaining in the list, the system creates a new Emission object (see elements 445, 447, and 449) from the XmitTrackElement, and the power level of the emission from the Transmitter to the Receiver is computed (see, also, the Emissions associated with the previously-validated TestPlan—identified as elements 478, 476, and 474). In one example, for this computation, the position of the Transmitter is determined by the center of the Bin associated with the XmitTrackElement and the position of the Receiver is determined by the center of the Bin associated with the RecvTrackElement. Channel propagation models of the airspace and geographical terrain data may also used in the computation.

To determine the "signal" reaching the RecvTrackElement, the system first determines the Emission objects associated with XmitTrackElements that are a part of this Channel—see elements 445, 447 and 449, having lines marked as "signal" in FIG. 4 (of note, such emission objects that are part of this Channel are all associated with the TestPlan being validated (element 401)). In this example, the system selects the weakest power level from these Emission objects. To determine the "interference" reaching the RecvTrackElement, the system first determines the Emission objects associated with the XmitTrackElements that are not a part of this Channel—see elements 478, 476, and 474, having lines marked as "interference" in FIG. 4 (of note, such emission objects that are not a part of this Channel may be associated with another channel in the TestPlan being validated (element 401) and/or a Channel in a previously validated Test Plan (element 498)). In this example, the system selects the Emission object with the strongest power level for each transmitter. The system now determines the SINR, with the inputs of the signal power level and the sum of the interference power levels from each interfering transmitter.

If the SINR is not adequate for the desired/required quality of the Channel, the system abandons the attempt to assign the current frequency band by removing the current FreqBand instance associated with the Channel, along with its Emission objects.

If the SINR is adequate for each RecvTrackElement, the system moves on to check if the current FreqBand assignment to the Channel will cause interference to any TestPlans that have been previously validated that may be scheduled to execute at the same time. For each XmitTrackElement belonging to the Channel:

The system performs a database query to discover all RecvTrackElements that overlap in time and frequency. The system creates a new Emission object from the XmitTrackElement to each of these RecvTrackElements. In each case, the Emission object computes the power-level of the emission from the spectrum Bin associated with the XmitTrackElement to the spectrum Bin associated with the RecvTrackElement.

The additional Emission objects thus generated alter the emissions topology of the Channels that "own" the RecvTrackElements. For each of these Channels, the system re-computes the SINR, as described above. If the SINR is inadequate for any of these Channels, the current FreqBand assignment is deemed to be interfering with a previously-validated TestPlan. In one example, the system abandons the attempt to assign the current FreqBand by removing the FreqBand object and its associated Emissions.

It remains to verify the Channel propagation. For each RecvTrackElement belonging to the Channel, the system determines the time-overlapping XmitTrackElements which are intended to communicate with the RecvTrackElement, as part of the Channel. The system verifies propagation from the power-levels of the already-existent Emission object between each Channel XmitTrackElement and RecvTrackElement. In one example, if the power levels are not adequate for the desired/required propagation levels for Channel quality, the system terminates the validation with a 'propagation problem' status for the TestPlan.

Using the above example method, the system attempts to assign a frequency band to each Channel belonging to the TestPlan being validated. If it is successful for all Channels, the TestPlan is considered to have a "validated" status. If it turns out that a Channel cannot be assigned a frequency band even with reuse, the system terminates the validation, assigning a "has-conflicts" status to the TestPlan.

If a TestPlan is successfully validated, its frequency band assignments and consequent Emission objects are made permanent in the database. They will be called upon in future TestPlan validations to determine Channel interference. If the TestPlan is not successfully validated, its temporary FreqBand assignments and related Emission objects are removed.

If the User has specified the flexible start time option for a TestPlan, while attempting to assign a frequency band with reuse, the system takes note of the end time of each Channel belonging to a previously-validated TestPlan that the current assignment is conflicting with. The system computes the latest of all such end times. In this example, if the assignment attempt ends in failure, the system determines a "recommended start time" as: (latest end time of conflicting Channel(s))+(a guard time interval).

The system now sets the start time to the new recommended start time and attempts to re-validate the TestPlan. The system continues to step through time in this manner into the future, until it determines a start time at which the TestPlan can be successfully validated (or a fatal error condition is determined).

With this flexible start time option, the TestPlan is re-scheduled to the earliest possible time at which sufficient frequency bands will be available to support running the test.

Figure 5:
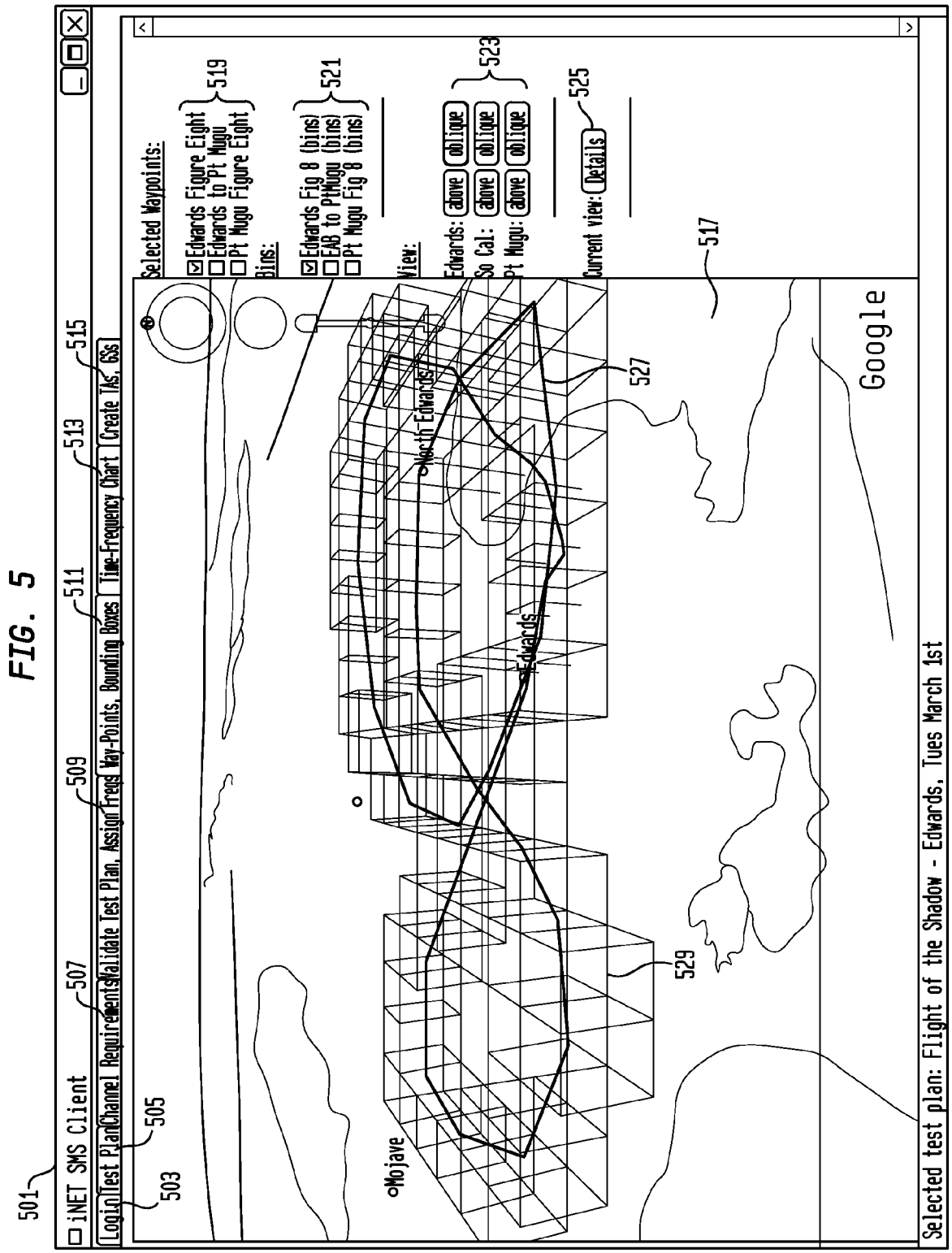
FIG. 5 is one aspect of a GUI associated with a software program according to one embodiment of the present invention (this Fig. shows a spatial view of Flight Path and Spectrum Bins)

Referring now to FIG. 5, a GUI 501 of a software program according to an embodiment of the present invention is shown. As seen, a number of "tabs" are provided, including Login 503; Test Plan 505; Channel Requirements 507; Validate Test Plan, Assign Frequencies 509; Way-Points, Bounding-Boxes 511; Time-Frequency Chart 513; and Create TAs (Test Articles) and GSs (Ground Stations) 515.

With reference in particular now to the Way-Points, Bounding-Boxes 511 tab, it is seen that the example display may include a 3D spatial view over the earth's terrain (see element 517). Further: one or more waypoints may be selected for display on the earth view (see element 519); one or more bins may be selected for display on the earth view (see element 521); one or more views may be selected for the display of the earth view (see element 523); and details of the current view may be requested (see element 525).

In addition, the flight plan of a test article may be displayed (see element 527) and the related spectrum bins may be displayed (see element 529—of note, element 529 identifies, in the aggregate, all of the individual spectrum bins shown). In other examples, this view can show TrackElements, the predicted Channel weighted-mean SINR and/or propagation quality for each TrackElement/Bin. In yet another example, the 3D spatial view over the earth's terrain (see element 517) may be interactive, scrollable, dragable, zoomable, and/or resizeable. In yet another example, the 3D spatial view over the earth's terrain (see element 517) may form all or part of a test plan report (e.g., a report shown on a display and/or produced in hardcopy). In another example, the view may be color-coded.

Figure 6:
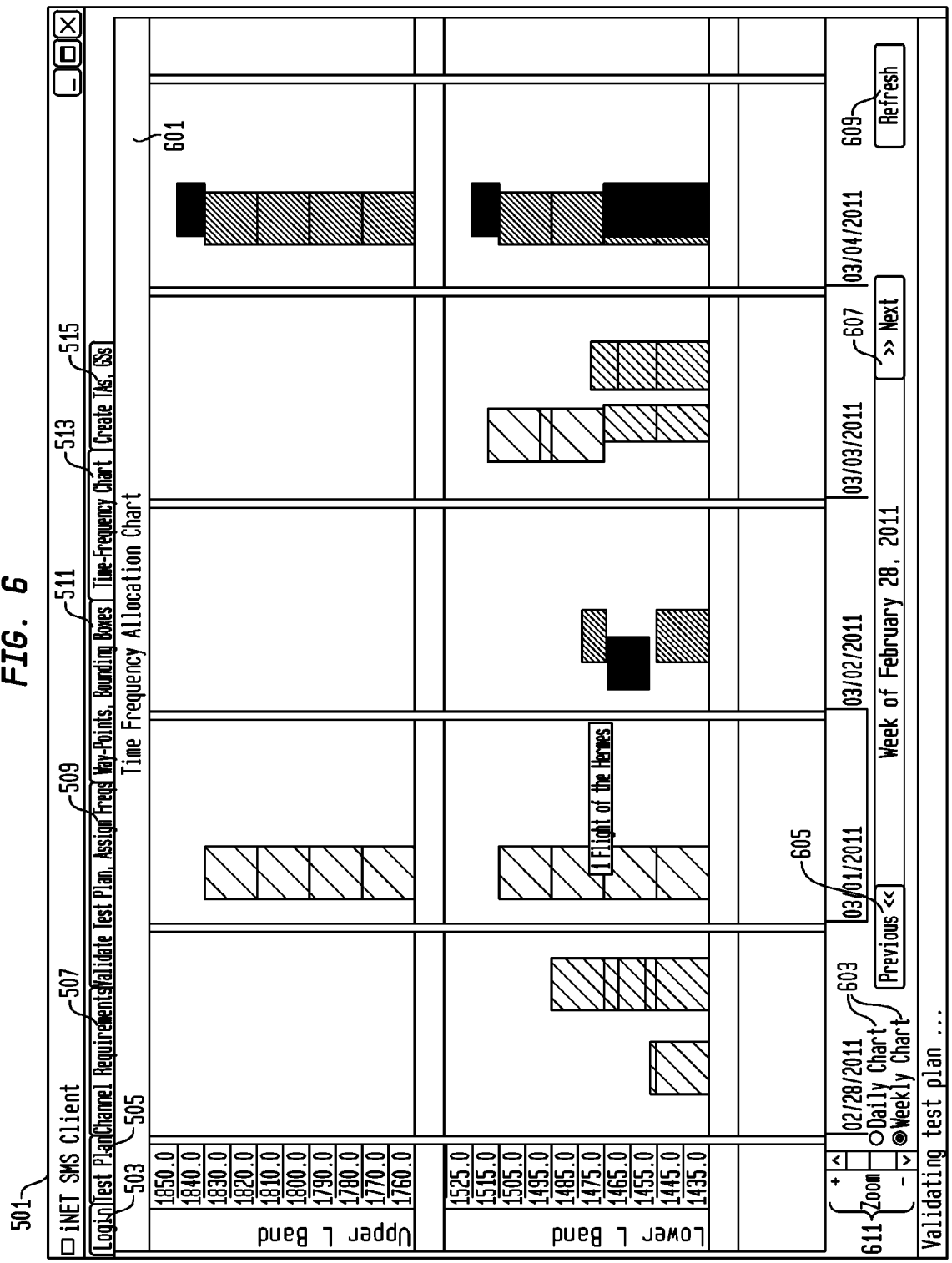
FIG. 6 is one aspect of a GUI associated with a software program according to one embodiment of the present invention (this Fig. shows a Time-Frequency Chart—Weekly View)

Referring now to FIG. 6, the GUI 501 of a software program according to an embodiment of the present invention is again shown. With reference in particular now to the Time-Frequency Chart 513 tab, it is seen that the display may include a useful Time-Frequency AssignmentChart of the type shown as element 601. For a fixed volume of airspace, this chart displays frequency band occupancy of each TestPlan over time. The example view of FIG. 6 is a weekly view, which may be selected via element 603. Further, previous and next weeks may be selected via elements 605 and 607, respectively; the view may be refreshed via element 609; and the view may be zoomed via element 611. In yet another example, the view may be interactive, scrollable, dragable, zoomable, and/or resizeable. In yet another example, the view may form all or part of a test plan report (e.g., a report shown on a display and/or produced in hardcopy). In another example, the chart may be color-coded.

Figure 7:
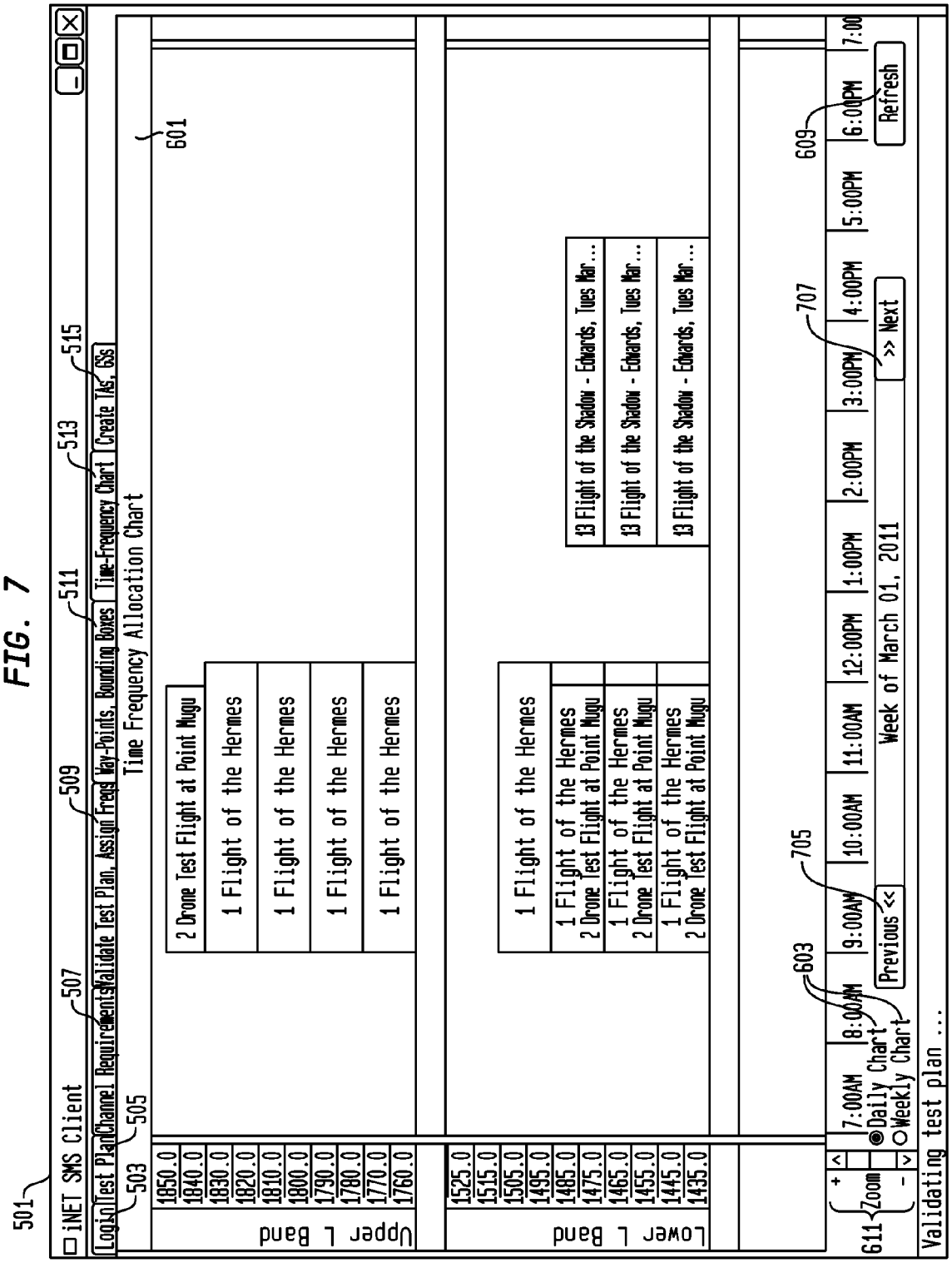
FIG. 7 is one aspect of a GUI associated with a software program according to one embodiment of the present invention (this Fig. shows a Time-Frequency Chart—Daily View, Showing Frequency Reuse).

Referring now to FIG. 7, the GUI 501 of a software program according to an embodiment of the present invention is again shown. With reference again in particular to the Time-Frequency Chart 513 tab, it is seen that the Time Frequency Allocation Chart 601 may be shown as a daily chart (as mentioned above, the view in FIG. 6 was as a weekly chart—this view is a more detailed daily view). Of note, this example shows a band with overlapping TestPlans taking advantage of frequency reuse. In contrast to FIG. 6, the example view of FIG. 7 is a daily view, which may be selected via element 603. Further, previous and next days may be selected via elements 705 and 707, respectively; the view may be refreshed via element 609; and the view may be zoomed via element 611. In yet another example, the view may be interactive, scrollable, dragable, zoomable, and/or resizeable. In yet another example, the view may form all or part of a test plan report (e.g., a report shown on a display and/or produced in hardcopy). In another example, the chart may be color-coded.

As described herein, once the validation process is complete for a set of TestPlans, the database has a wealth of information to provide to the user, in the form of displays and reports. One example output is a report on the recommended start time and the frequency band assignments for a validated TestPlan.

As described herein, one advantage of the time-frequency chart in this example system is that the chart can be generated, by querying the database, for selected volumes of airspace. Various examples of ways that the User can generate a time-frequency chart are: (a) For spectrum Bins surrounding a particular test range; (b) For a set of spectrum Bins manually selected by the User; and/or (c) For the set of spectrum Bins that are touched by the test articles and ground stations of a specified TestPlan. For example, if a TestPlan involves a test article moving between two test ranges, a time-frequency chart can be generated for the Bins surrounding each test range and the movement corridor between them.

As described herein, various embodiments of the present invention provide a tool, such as for use by a frequency manager, with one or more of the following capabilities: (a) provide a central object-oriented database that precisely models the relevant aspects of upcoming test plans; (b) bound the uncertainty of a test article's position caused by the test article's potential lateness, allowing optimal usage of spectrum (accounting for the reality that test articles may be launched late); (c) store numerous "track elements", each relating to a five-dimensional quantum of space (x, y, z), time and frequency in a database to predict the RF emissions from a mix of upcoming tests at a test range; (d) automatically generate frequency band assignments from a pool of available frequencies for the wireless communication channels of upcoming tests; (e) provide a client-server system with a central database to allow frequency managers at multiple test ranges to plan tests collaboratively; (f) determine a frequency band that may be assigned with reuse (in the event that no frequency band is available for a given wireless communication); (g) verify RF propagation for a given wireless communication channel over the flight path of an associated test article; (h) on request, automatically re-schedules a test to the earliest possible time when the appropriate spectrum will be available to support running the test; (i) use multiple path-loss models and adaptively select an appropriate path-loss model (e.g., depending on the elevations of a transmitting track element and receiving track element, and the intervening terrain); (j) handle steerable directional antennas that introduce additional free variables to the optimization problem; and/or (k) search towards the optimal spectrum allocation solution that increases wireless communication channel quality for every test plan while keeping the spectrum usage as low as possible.

In other embodiments, when generating a report identifying a plurality of recommended frequency band assignments to be used during performance of a to-be-validated test plan, such recommended frequency band assignments may be based at least in part upon at least one of: predicted motion(s) stored in a database; frequency band assignment(s) stored in a database; and/or predicted radio frequency emission(s) stored in a database.

In other embodiments, computations may be performed for additional test(s) with additional test article(s) that may desire to reuse the frequency spectrum in the same time and space as other test article(s), wherein the computations for additional test(s) may be based at least in part upon at least one of predicted motion(s) stored in a database; frequency band assignment(s) stored in a database; and/or predicted radio frequency emission(s) stored in a database.

In other embodiments, when displaying an indication of free (or available) spectrum, an indication of assigned spectrum, and an indication of reused spectrum on a graphical user interface, such display may be based at least in part upon at least one of: predicted motion(s) stored in a database; frequency band assignment(s) stored in a database; and/or predicted radio frequency emission(s) stored in a database.

In other embodiments, any display provided may be provided for manual assessment by a user.

In another embodiment, determining radio frequency propagation from a respective transmit track element to a respective receive track element may be performed by retrieving a previously-generated emission object or by generating an emission object with the channel propagation if such an emission object was not previously generated.

In another embodiment, after determining radio frequency propagation from a respective transmit track element to a respective receive track element, a respective test plan may be abandoned if this channel propagation level is not adequate to support a desired channel quality.

In other embodiments, parametrizing the uncertainty in a moving object's position due to potential lateness is performed. In one specific example, the bounding of this lateness with a track element is provided.

In other embodiments, the probability of the presence of a test article in a five-dimension quantum (space, time, frequency) is captured. In one specific example, this probability of the presence of a test article is captured via use of a track element. In another specific example, such a track element may be used in conjunction with RF propagation calculations.

In other embodiments, an effective display of the predicted flight plans of test articles and the consequent predicted channel quality may be provided by: displaying the flight plan of each selected test article over a resizable, traversable terrain-map of the earth; for each such flight plan, overlaying the display with the containing spectrum bins, drawn translucently, so as to show the flight plan, the terrain, as well as each spectrum bin; and for each spectrum bin, providing an annotation that effectively displays the associated track element by displaying the start and end times; for each required channel between two test articles or a test article and a ground station—for each receive track element in the channel—for each time-overlapping transmit track element belonging to the same channel—drawing a color-coded line from the center of the bin associated with the transmit track element to the center of the bin associated with the receive track element—wherein the color-coding of the line indicates the quality of the channel transmission, based on propagation and SINR, for the time-interval common to the transmit track element and the receive track element.

In other embodiments, an effective display of a time-frequency chart, whereby the user can visualize the frequency-band occupancy of test plans and their channels over time for a selected volume of airspace may be provided by: requiring the user to select a set of bins describing an airspace, which may be accomplished by: requiring the user to directly select a set of spectrum bins; requiring the user to select a large polyhedron, such as the airspace surrounding a test range, and considering the bins inside the polyhedron as being selected; and/or, requiring the user to select a test plan and considering all the bins associated with the test plan as being selected; then, drawing a graph showing time on the X axis and ascending frequencies on the Y axis; querying the database to determine the channels with assigned frequency bands, associated with the selected bin-set; depicting each such frequency band on the graph with a rectangle, whose height spans the range from the minimum frequency to the maximum, and whose width spans the time interval of the channel, annotating each such rectangle with text providing the name of the test plan that owns the channel; depicting areas in which the rectangles overlap with a special color, e.g. black, to show frequency reuse, annotating these areas with a text list naming the overlapping test plans; and depicting areas with no frequency occupancy with a special color, e.g. white.

In other embodiments, the uncertainty due to lateness in the geometry and motion of the beam of a steerable, tracking antenna may be accounted for in calculating channel propagation and interference by: creating track elements, similar to those described herein, but enhanced to describe the motion of the beam through space and time by: describing the flight plan of the test article that the antenna is tracking with its beam; for each point in the flight plan, determining the containing bin; drawing a line from the antenna to the center of this containing bin; determining a beam from the antenna centered around this line; and copying the start and end times of this beam-associated track element from the start and end times of the bin.

In another embodiment, searches towards the optimal spectrum allocation solution that increases channel quality for every test plan in a database while keeping the spectrum usage as low as possible may be provided (such a "super-optimal" frequency assignment solution may be designed to provide the best overall channel quality for the lowest spectrum usage).

As described herein, various embodiments of the present invention do not use the approximation of frequency band allocations within volumes of space or time at all. Instead (in these embodiments), hypothetical assignments are made of frequency bands to transmitters and receivers in the test plan and a computer is used to predict the precise effect of potential emissions from each transmitter to every receiver in the time and space of a test. Unknowns, regarding the future, are dealt with by bounding them and making the analysis of resulting emissions a worst-case analysis.

RE propagation models and terrain data of the type know to those of ordinary skill in the art may be used to compute the power-level of each potential emission. The easy availability of computing power and disk space provides the ability to compute each emission, storing huge sets of 'emission objects' in a database and subsequently accessing them to precisely predict RF channel propagation and signal-to-interference ratio.

In various examples, the airspace is not segmented in terms of where a transmitter may transmit. It may transmit anywhere in the airspace, so long as a subsequent analysis of emissions determines that it will not interfere with the signals of other transmitters at the same frequency at the same time.

In other examples, knowledge of directional antennas and their antenna patterns, where available, are fully utilized. The emission computations may be made using this knowledge, increasing the potential for frequency reuse.

In yet other examples, time, too, is not broken up into approximate chunks. A user-determined 'lateness' attribute may be assigned to each test plan (and/or to each test article of each test plan). This constitutes an assurance to the system that, if a test article movement is delayed beyond the lateness interval, the test will be cancelled. The system then uses the flight plan and the lateness attribute to determine a series of transmit track elements and receive track elements. A transmit track element expresses a greater-than-zero probability that a transmitter will occupy a specified (e.g., small) quantum of airspace (a bin) between a specified start and end time. A receive track element likewise expresses a better-than-zero probability that a given receiver will occupy a specified bin between a specified start and end time. Using these objects in the database, the system calculates all potential emissions and performs a worst-case analysis to determine predicted RF channel quality.

In yet another example of the present invention, there is no approximation of a large spatial allocation for spectrum. The best known information about the flight plan is utilized. Multiple such flights would be allowed to traverse the same 'flight area', allowing more granular spectrum assignment.

In yet another example of the present invention, the conventional problem of leakage of emissions across airspace boundaries disappears (since in this example spectrum is not allocated by spatial volume).

In yet another example of the present invention, frequency reuse occurs naturally. A hypothetical reuse assignment is made, and then tested with a worst-case analysis of the resulting emissions.

In yet another example of the present invention, by using a lateness attribute, as a contract between user and system/method, multiple tests can be accommodated within the same day: the system/method predicts the latest possible end-time of each test. The lateness attribute can be tuned in the field depending on the mission-criticality of the test and level of lateness the frequency planners are willing to tolerate.

In yet another example of the present invention, flight plan information is fully utilized. Once a vehicle has finished traversing a portion of its flight plan, the spectrum in the already-traversed portion can potentially be reused for other transmissions.

In yet another example of the present invention, the system/method automatically tunes its granularity in assigning spectrum to the information available. The more information is available, such as flight plans, lateness and antenna patterns, the more optimal use the system/method is able to make of the available spectrum, while still assuring de-confliction.

In yet another example of the present invention, the system/method does not require a static allocation of the scope of its airspace. Instead, the airspace managed expands as needed with the flight plans of newly-requested tests.

As described herein, various embodiments of the present invention may provide a test range spectrum management system. Further, a more general network and/or spectrum management system may utilize various embodiments of the present invention. For example, frequency assignments in any scenario which includes moving objects in a space, communicating with one another via RF devices may be supported. One such scenario is the tactical battlefield, where land, sea and/or air vehicles engaged in network-centric warfare need to communicate with a limited allocation of spectrum. In another example, any information available to the system regarding the probable motion of the objects may be used to make more optimal frequency assignments. Further, using the sophisticated location determination technologies typically available, such a system could infer the expected trajectories of vehicles in the space from their current trajectories.

In another scenario, aspects of the present invention would be applicable to commercial aircraft, using radio communications for multiple applications. Radio communications at sea among merchant ships is yet another example.

In another example, aspects of the present invention with regard to software and functionality could be used to make dynamic, short-time-frame spectrum assignments in the cell of a cellular network, taking optimal advantage of frequency reuse. In one example, such a system could infer the expected motion of cell phones within probabilistic bounds, perform a worst case analysis of expected emissions, and make dynamic frequency assignments, optimized to the extent of the available information about transmitters and receivers in the cell.

In other embodiments, precision frequency band assignments are made for rapidly-moving air, ground and/or water vehicles, through an extensible airspace, where the method used is to compute and analyze RF emissions in quanta of space, time and frequency.

As described herein, various embodiments may operate in a manner that achieves a previously unattained level of frequency re-use, in terms of maximized spectrum usage and improved channel quality.

As described herein, various embodiments may provide a technique minimizing a number of computations necessary with regard to emissions from transmitters in test articles or ground stations to receivers in test articles or ground stations.

As described herein, various embodiments may provide: time-based reservation of frequency bands; space-based reservation of frequency bands; utilization of flight plan information; utilization of ground route information; utilization of lateness information; and/or granular assignment of frequency bands with knowledge of objects moving in space.

In other examples, the present invention may be applied to commercial use and/or to military use.

In other examples, the present invention may be applied in the context of avionics use.

In other examples, the present invention may be applied to spectrum planning.

In another example, an embodiment may comprise storing each frequency band assignment of the test plan currently being validated, once completed, along with each track element, each emission and each channel quality evaluation in at least one storage device, to be used in subsequent test plan validation(s) where at least one of the current test plan's channels is time-coincident and frequency-coincident with those of a test plan subsequently being validated.

In other examples, any steps described herein may be carried out in any appropriate desired order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. In one example, the computer readable medium may tangibly embody the program code in a non-transitory manner.

Computer program code for carrying out operations for aspects of the present invention may be written in any desired language or in any combination of one or more programming languages, including (but not limited to) an object oriented programming language such as Java, Smalltalk, C++ or the like or a procedural programming language, such as the "C" programming language or similar programming languages.

Aspects of the present invention are described herein with reference to systems, methods, and/or computer program products. It will be understood that each of such systems, methods, and/or computer program products can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified.

Further, these computer program instructions may be stored in a computer readable medium that can direct a computer, other programmable data processing apparatus, or other device(s) to function in a particular manner, such that the instructions stored in the computer readable medium produce an article of manufacture including instructions which implement the function/act specified.

Further, these computer program instructions may be loaded onto a computer, other programmable data processing apparatus, or other device(s) to cause a series of operational steps to be performed on the computer, other programmable apparatus or other device(s) to produce a computer implemented process such that the instructions which execute on the computer or other programmable apparatus or other device(s) provide processes for implementing the functions/acts specified.

Various aspects of the disclosure of this application are directed to the architecture, functionality, and operation of possible implementations of systems, methods and computer program products. In this regard, any hardware or software block or function shown or described may represent a module, segment, or portion of code, which comprises one or more executable instructions for implementing the specified logical function(s). It should also be noted that, in some implementations, the block(s) or function(s) may occur out of the order noted in the figures or text. For example, two blocks or functions shown in succession may, in fact, be executed substantially concurrently, or the blocks or functions may sometimes be executed in the reverse order, depending upon the functionality involved.

It is noted that the foregoing has outlined some of the embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. Further, it is noted that all examples disclosed herein are intended to be illustrative, and not restrictive.

What is claimed is:

1. A method implemented by one or more computers, the method creating a plan of frequency band assignments to radio frequency (RF) communication channels between a set of one or more test articles expected to be moving through three-dimensional space in the future and a set of one or more mobile or stationary ground stations, wherein a future scenario consisting of at least one mobile test article and at least one ground station is grouped into a test plan, wherein the process of assigning frequency bands to the communication channels between the at least one mobile test article and the at least one ground station is a validation, and wherein information, including one or more frequency assignments associated with one or more test plans that have already been validated, reside in at least one storage device, the method comprising:
(a) associating knowledge of a respective flight plan with each test article, wherein each flight plan comprises a route that the test article is expected to fly along, or a designation of a polyhedron of airspace within which the test article is expected to fly;
(b) associating knowledge of a respective ground route with each ground station, wherein each ground route comprises a route that the ground station is expected to follow, or an area within which the ground station is confined, or a fixed location where a stationary ground station is positioned;
(c) accounting for any test article commencing its flight plan late by an unpredicatable time interval and any ground station commencing its ground route late by an upredictable time interval with a respective maximum lateness attribute, wherein the associated test plan is expected to be cancelled or re-planned if its commencement is delayed beyond the maximum lateness;
(d) quantizing the totality of the airspace through which each test article is expected to travel and the totality of the ground area that each ground station is expected to traverse into spectrum bins, which are fixed-sized quanta of airspace, each at a fixed location over or on the surface of the earth;
(e) quantizing the maximum time interval that each test article may exist inside a spectrum bin, as a function of its flight plan and its maximum lateness, and that each ground station may exist inside a bin as a function of its ground route and its maximum lateness with a track element, associated with each bin traversed;
(f) from each track element, deriving a transmit track element for each transmitter inside a test article or a ground station that is associated with a given channel, and a receive track element for each receiver inside a test article or a ground station that is associated with the given channel;
(g) for each channel in a test plan currently being validated, first attempting to assign a frequency band that is unused over the maximum time interval that the channel is expected to exist, accounting for respective maximum lateness attributes of each respective test article and each respective ground station, and, failing this attempt, attempting to make an assignment with frequency reuse, wherein a testing to determine assignment with reuse comprises:
  (i) determining the optimal reused frequency band to assign to the present channel by evaluating, in turn, each potentially reusable frequency band in a totality of an available spectrum for the channel quality each potentially reusable frequency band provides while not degrading below a respective acceptable threshold the quality of any other time-coincident and frequency-coincident channel belonging to a previously-validated test plan,
    (1) wherein channel quality is calculated by taking the mean, weighted by bin size, of each signal-to-interference-and-noise ratio (SINR) experienced by each receive track element belonging to the present channel, and
    (2) wherein potential degradation of each previously-validated channel is determined by re-calculating the channel quality of the previously-validated channel, taking into account any additional interfering emissions from each transmit track element of the present channel, and rejecting the potential reused frequency assignment if the quality of the previously-validated channel falls below an acceptable threshold, and
  (ii) assigning the optimal reused frequency band to the present channel; and
(h) storing each frequency band assignment of the test plan currently being validated, once completed, along with each track element, each emission and each channel quality evaluation in the at least one storage device, to be used in subsequent test plan validations where at least one channel of the test plan currently being validated is time-coincident and frequency-coincident with at least one channel of a test plan subsequently being validated.

2. The method of claim 1, wherein the SINR for each receive track element belonging to a given channel is calculated by:
  (a) querying the at least one storage device for each transmit track element that is time-coincident with the present receive track element and frequency-coincident with the frequency band that is currently being evaluated for assignment;
  (b) creating an emission object associated with each transmit track element and the present receive track element, which calculates the power of the RF emission received from the transmit track element to the present receive track element, using at least one RF propagation model that takes into account at least terrain and obstructions;
  (c) characterizing each emission from a transmit track element belonging to the given channel as a channel emission, and each emission from a transmit track element belonging to another, previously-validated channel as an interfering emission; and
  (d) calculating the SINR associated with each channel emission by:
    (i) determining a track interval of the channel emission, wherein the track interval is the overlapping time interval between the respective transmit track element and the respective receive track element,
    (ii) determining a sub-set of interfering emissions that are time-coincident with the track interval of the present channel emission,
    (iii) over the track interval, computing the sums of the interfering emissions, time-coincident with one another, and taking the maximum of these sums as the interference value in the SINR calculation,
    (iv) using the channel emission received power for the signal comprising the numerator of the SINR value, and
    (v) calculating the SINR as =signal/{interference+(constant ambient noise value)}.

3. The method of claim 2, further comprising:
  (i) determining a signal power level by identifying the minimum of the power levels from each transmit track element associated with each transmitter associated with the communication channel under test;
  (ii) determining an interference power level by summing the maximum of power levels from each transmit track element associated with each transmitter associated with communication channels other than the communication channel under test;
  (iii) determining a signal-to-interference-and-noise ratio based upon the determined signal power level and interference power level; and
  (iv) causing abandonment of the temporary frequency band assignment if SINR does not meet desired communication channel quality requirements.

4. The method of claim 3, further comprising:
  for each transmit track element associated with the communication channel under test:
    (i) performing a query of the at least one storage device to retrieve all the time-overlapping and frequency-overlapping receive track elements associated with each communication channel associated with each previously-validated test plan; and
    (ii) for each receive track element retrieved in step (3)(i):
      (a) generating an emission object that identifies a power level of an RF emission from a respective transmit track element to a respective receive track element;
      (b) re-calculating a signal-to-interference-and-noise ratio of a respective communication channel from a respective previously-validated test plan, which is now affected by the additional emission from the transmitter of the communication channel under test; and
      (c) causing abandonment of the temporary frequency band if the signal-to-interference-and-noise ratio determined in step (3)(ii)(b) does not meet desired communication channel quality requirements.

5. The method of claim 2, wherein the steps are carried out in the order recited.

6. The method of claim 2 further comprising providing on a display, for each test article and ground station, an indication of a respective predicted motion as expressed by track elements and associated bins.

7. The method of claim 6, further comprising providing on the display, for each test article, an indication of channel quality, comprising a display of the transmit track element and receive track element, with associated bins, of each channel emission and, further a display of the signal-to-interference-and-noise ratio and signal power level for each channel emission.

8. The method of claim 1, wherein each flight plan associated with each test article, to the degree that it is known, is associated with the respective test article in the at least one storage device and is used to obtain bounds for the predicted motion of the respective test article, wherein the bounds are used in calculating the power of emissions received from one or more other test articles or one or more ground stations, or emissions transmitted to one or more other test articles or one or more ground stations, the emission power levels being used to calculate the predicted worst-case quality of at least one communication channel between the respective test article and the other one or more test articles or one or more ground stations.

9. The method of claim 1, wherein each ground route or fixed location associated with each ground station, to the degree that it is known, is associated with the respective ground station in the at least one storage device and is used to obtain bounds for the predicted motion of the respective ground station, where the bounds are used in calculating the power of emissions received from one or more test articles, or emissions transmitted to one or more test articles, the emission power levels being used to calculate the predicted worst-case quality of at least one communication channel between the respective ground station and the one or more test articles.

10. The method of claim 1, wherein it is a valid approximation that an emission power level calculation from the center of the spectrum bin of a respective transmitter to the center of the spectrum bin of a respective receiver is representative of all emission calculations from any point in the spectrum bin of the respective transmitter to any point in the spectrum bin of the respective receiver.

11. The method of claim 1, wherein an uncertainty with respect to when a respective test article will be at what point in its flight plan, or when a respective mobile ground station will be at what point in its ground route, is bounded by a characterization of the respective flight plan or the respective ground route with a respective maximum lateness attribute, which then allows the generation of a track element, associated with each spectrum bin containing at least a portion of the respective flight plan or at least a portion of the respective ground route, that specifies an earliest time to a latest time between which there is a possibility of the respective test article or the respective ground station being inside the respective spectrum bin, each track element thus representing a time-space quantum of a trajectory of the respective test article or the respective ground station.

12. The method of claim 11, wherein each earliest time of each track element comprises one of:
   (a) a start time of a flight plan of a respective test article; and
   (b) a time of entry of a respective test article from a previous spectrum bin covering a respective flight plan into a current spectrum bin.

13. The method of claim 11, wherein each latest time of each track element comprises:
   (a) a time of entry into a current spectrum bin; plus
   (b) a time a respective test article takes to travel through the current bin; plus
   (c) a respective maximum lateness attribute.

14. The method of claim 13, wherein each time of entry into a current spectrum bin comprises one of:
   (a) a start time of a flight plan of a respective test article; and
   (b) a time of departure of a respective test article from a previous spectrum bin.

15. The method of claim 1, wherein each track element associated with a respective test article or a respective ground station is used to derive a transmit track element for each transmitter inside the respective test article or the respective ground station by copying a time interval of the track element into the newly-created transmit track element, and a receive track element for each receiver inside the respective test article or the respective ground station also by copying the time interval of the track element into the newly-created receive track element.

16. The method of claim 1, wherein for each receive track element, the received power is calculated from each time-coincident and frequency-coincident transmit track element, with the help of at least one RF propagation model, and the emission values are used to evaluate channel quality by characterizing an emission as either a channel emission if the transmitter of the transmit track element belongs to the same channel as the receiver of the receive track element, or as an interfering emission if the transmitter of the transmit track element belongs to a different channel from the receiver of the receive track element.

17. The method of claim 1, wherein the reused frequency band that is predicted to provide the highest weighted-mean SINR value for the respective channel is selected, while ensuring that the interference from the one or more transmitters associated with a respective channel at that frequency does not degrade the quality, measured by the weighted-mean SINR, below an acceptable threshold of other, previously-validated, time-coincident and frequency-coincident channels.

18. The method of claim 1, wherein:
   a test plan has associated therewith a plurality of expected moving test articles;
   each test article of a previously-validated test plan has associated therewith at least one communication channel used by at least one transmitter and at least one receiver; and
   each test article associated with the previously-validated test plan has associated therewith a flight plan, including a plurality of flight plan attributes.

19. The method of claim 1, further comprising storing a plurality of frequency band assignments in the at least one storage device.

20. The method of claim 1, wherein:
   step (g)(i) comprises determining if the predicted radio frequency emissions will support, for each communication channel, a desired channel quality with regard to radio frequency propagation and signal-to-interference-and-noise ratio.

21. The method of claim 1, wherein:
   step (g)(i) comprises determining if the predicted radio frequency emissions will support, for each communication channel, a desired channel quality with regard to signal-to-interference-and-noise ratio; and
   wherein the interference is deemed to occur between at least one communication channel of a previously-validated test plan predicted to overlap in time and space with the communication channel currently being validated.

22. The method of claim 1, wherein:
   step (g)(i) comprises determining if the predicted radio frequency emissions will support, for each communication channel, a desired channel quality with regard to signal-to-interference-and-noise ratio; and
   wherein the interference is deemed to occur between at least the communication channel currently being validated and another channel belonging to the same test plan.

23. The method of claim 1, further comprising generating a report identifying a plurality of recommended frequency band assignments to be used during performance of the test plan being validated.

24. The method of claim 1, further comprising displaying an indication of free spectrum, an indication of assigned spectrum, and an indication of reused spectrum on a graphical user interface.

25. The method of claim 24, wherein the indication of reused spectrum comprises an indication of reused spectrum that is assigned.

26. The method of claim 1, wherein the predicted motion of a respective test article or a respective ground station further comprises accounting for any late launching of the respective test article or the respective ground station by assigning each test article and ground station a maximum lateness attribute, wherein the maximum lateness attribute represents the maximum time interval that the respective test article or the respective ground station is assumed to launch late, after which movement of the respective test article or respective ground station is considered cancelled.

27. The method of claim 1, wherein the computer comprises a plurality of computers.

28. The method of claim 1, wherein the steps are carried out in the order recited.

29. The method of claim 1, further comprising providing on a display, for each test article and ground station, an indication of a respective predicted motion as expressed by track elements and associated bins.

30. A method implemented by at least one computer that provides a plurality of frequency band assignments, wherein a plurality of test articles expected to be moving through three-dimensional space in the future and a set of one or more mobile or stationary ground stations, wherein a future scenario consisting of at least one mobile test article and at least one ground station is grouped into a test plan, wherein the process of assigning frequency bands to the communication channels between the at least one mobile test article and the at least one ground station is a validation, wherein one or more frequency assignments associated with one or more test plans have already been validated, wherein each of the test articles is associated one of a plurality of previously-validated test plans, wherein each of the test articles has associated therewith at least one communication channel used by at least one of a transmitter and a receiver, and wherein each of the test articles has associated therewith a respective flight plan including a plurality of flight plan attributes, the method comprising:
- (a) selecting a set of the previously-validated test plans for optimization;
- (b) creating a communication channel super set including of all the communication channels associated with the selected set of previously-validated test plans;
- (c) determining all possible permutations of the order in which each of a plurality of frequency bands may be assigned to each of the communication channels in the communication channel super set;
- (d) for each permutation, creating a solution set of assignments of each of the frequency bands to each of the communication channels;
- (e) evaluating a degree to which each solution set is optimal, wherein the degree to which each solution set is optimal is measured by a metric; and
- (f) determining the solution set with the highest value for the metric.

31. The method of claim 30, wherein a plurality of inputs to the evaluation comprise: signal-to-interference-and-noise ratio; channel propagation; and amount of spectrum used.

32. The method of claim 31, wherein the signal-to-interference-and-noise ratio comprises an overall signal-to-interference-and-noise ratio and the channel propagation comprises an overall channel propagation.

33. The method of claim 30, further comprising, after step (a) and before step (b): releasing for possible assignment any frequency bands currently assigned to the selected set of test plans.

34. The method of claim 30, further comprising, after step (f): discarding all solution sets other than the solution set with the highest value for the metric and using the solution set with the highest value for the metric for the assignment of frequency bands to channels across the selected test plans.

35. The method of claim 30, wherein step (f) further comprises: if a plurality of solution sets are tied with the highest value for the metric, selecting one of the tied solution sets.

36. The method of claim 30, wherein the steps provide the best overall channel quality for the lowest spectrum usage.

37. The method of claim 30, wherein the computer comprises a plurality of computers.

38. The method of claim 30, wherein the steps are carried out in the order recited.

39. An article of manufacture, comprising:
at least one tangible computer readable device having a computer readable program code logic tangibly embodied therein to execute at least one machine instruction in at least one processing unit for creating a plan of frequency band assignments to radio frequency (RF) communication channels between a set of one or more test articles expected to be moving through three-dimensional space in the future and a set of one or more mobile or stationary ground stations, wherein a future scenario consisting of at least one mobile test article and at least one ground station is grouped into a test plan, wherein the process of assigning frequency bands to the communication channels between the at least one mobile test article and the at least one ground station is a validation, and wherein information, including one or more frequency assignments associated with one or more test plans that have already been validated, reside in at least one storage device, the computer readable program code logic, when executing, performing the following steps:
- (a) associating knowledge of a respective flight plan with each test article, wherein each flight plan comprises a route that the test article is expected to fly along, or a designation of a polyhedron of airspace within which the test article is expected to fly;
- (b) associating knowledge of a respective ground route with each ground station, wherein each ground route comprises a route that the ground station is expected to follow, or an area within which the ground station is confined, or a fixed location where a stationary ground station is positioned;
- (c) accounting for any test article commencing its flight plan late by an unpredicatable time interval and any ground station commencing its ground route late by an upredictable time interval with a respective maximum lateness attribute, wherein the associated test plan is expected to be cancelled or re-planned if its commencement is delayed beyond the maximum lateness;
- (d) quantizing the totality of the airspace through which each test article is expected to travel and the totality of the ground area that each ground station is expected to traverse into spectrum bins, which are fixed-sized quanta of airspace, each at a fixed location over or on the surface of the earth;
- (e) quantizing the maximum time interval that each test article may exist inside a spectrum bin, as a function of its flight plan and its maximum lateness, and that each ground station may exist inside a bin as a function of its ground route and its maximum lateness with a track element, associated with each bin traversed;
- (f) from each track element, deriving a transmit track element for each transmitter inside a test article or a ground station that is associated with a given channel, and a receive track element for each receiver inside a test article or a ground station that is associated with the given channel;
- (g) for each channel in a test plan currently being validated, first attempting to assign a frequency band that is unused over the maximum time interval that the channel is expected to exist, accounting for respective maximum lateness attributes of each respective test article and each respective ground station, and, failing this attempt, attempting to make an assignment with frequency reuse, wherein a testing to determine assignment with reuse comprises:
    - (i) determining the optimal reused frequency band to assign to the present channel by evaluating, in turn, each potentially reusable frequency band in a totality of an available spectrum for the channel quality each potentially reusable frequency band provides while not degrading below a respective acceptable threshold the quality of any other time-coincident and frequency-coincident channel belonging to a previously-validated test plan,
        - (1) wherein channel quality is calculated by taking the mean, weighted by bin size, of each signal-to-interference-and-noise ratio (SINR) experienced by each receive track element belonging to the present channel, and
        - (2) wherein potential degradation of each previously-validated channel is determined by re-calculating the channel quality of the previously-validated channel, taking into account any additional interfering emissions from each transmit track element of the present channel, and rejecting the potential reused frequency assignment if the quality of the previously-validated channel falls below an acceptable threshold, and (ii) assigning the optimal reused frequency band to the present channel; and (h) storing each frequency band assignment of the test plan currently being validated, once completed, along with each track element, each emission and each channel quality evaluation in the at least one storage device, to be used in subsequent test plan validations where at least one channel of the test plan currently being validated is time-coincident and frequency-coincident with at least one channel of a test plan subsequently being validated.

40. The article of manufacture of claim 39, wherein the steps are carried out in the order recited.

41. A system for creating a plan of frequency band assignments to radio frequency (RF) communication channels between a set of one or more test articles expected to be moving through three-dimensional space in the future and a set of one or more mobile or stationary ground stations, wherein a future scenario consisting of at least one mobile test article and at least one ground station is grouped into a test plan, wherein the process of assigning frequency bands to the communication channels between the at least one mobile test article and the at least one ground station is a validation, and wherein information, including one or more frequency assignments associated with one or more test plans that have already been validated, reside in at least one storage device of the system, the system comprising at least one processor unit configured for:

(a) associating knowledge of a respective flight plan with each test article, wherein each flight plan comprises a route that the test article is expected to fly along, or a designation of a polyhedron of airspace within which the test article is expected to fly;

(b) associating knowledge of a respective ground route with each ground station, wherein each ground route comprises a route that the ground station is expected to follow, or an area within which the ground station is confined, or a fixed location where a stationary ground station is positioned;

(c) accounting for any test article commencing its flight plan late by an unpredicatable time interval and any ground station commencing its ground route late by an upredictable time interval with a respective maximum lateness attribute, wherein the associated test plan is expected to be cancelled or re-planned if its commencement is delayed beyond the maximum lateness;

(d) quantizing the totality of the airspace through which each test article is expected to travel and the totality of the ground area that each ground station is expected to traverse into spectrum bins, which are fixed-sized quanta of airspace, each at a fixed location over or on the surface of the earth;

(e) quantizing the maximum time interval that each test article may exist inside a spectrum bin, as a function of its flight plan and its maximum lateness, and that each ground station may exist inside a bin as a function of its ground route and its maximum lateness with a track element, associated with each bin traversed;

(f) from each track element, deriving a transmit track element for each transmitter inside a test article or a ground station that is associated with a given channel, and a receive track element for each receiver inside a test article or a ground station that is associated with the given channel;

(g) for each channel in a test plan currently being validated, first attempting to assign a frequency band that is unused over the maximum time interval that the channel is expected to exist, accounting for respective maximum lateness attributes of each respective test article and each respective ground station, and, failing this attempt, attempting to make an assignment with frequency reuse, wherein a testing to determine assignment with reuse comprises:

(i) determining the optimal reused frequency band to assign to the present channel by evaluating, in turn, each potentially reusable frequency band in a totality of an available spectrum for the channel quality each potentially reusable frequency band provides while not degrading below a respective acceptable threshold the quality of any other time-coincident and frequency-coincident channel belonging to a previously-validated test plan, (1) wherein channel quality is calculated by taking the mean, weighted by bin size, of each signal-to-interference-and-noise ratio (SINR) experienced by each receive track element belonging to the present channel, and (2) wherein potential degradation of each previously-validated channel is determined by re-calculating the channel quality of the previously-validated channel, taking into account any additional interfering emissions from each transmit track element of the present channel, and rejecting the potential reused frequency assignment if the quality of the previously-validated channel falls below an acceptable threshold, and (ii) assigning the optimal reused frequency band to the present channel; and (h) storing each frequency band assignment of the test plan currently being validated, once completed, along with each track element, each emission and each channel quality evaluation in the at least one storage device, to be used in subsequent test plan validations where at least one channel of the test plan currently being validated is time-coincident and frequency-coincident with at least one channel of a test plan subsequently being validated.

42. The system of claim 41, wherein the processor unit comprises a plurality of processor units.

43. The system of claim 41, wherein the processor unit is configured by running a software application.

44. The system of claim 41, wherein the steps are carried out in the order recited.

* * * * *

UNITED STATES PATENT AND TRADEMARK OFFICE
CERTIFICATE OF CORRECTION

PATENT NO. : 8,615,263 B2  
APPLICATION NO. : 13/285221  
DATED : December 24, 2013  
INVENTOR(S) : Madon et al.

Page 1 of 1

It is certified that error appears in the above-identified patent and that said Letters Patent is hereby corrected as shown below:

In the Specification

In Column 5, Line 18, delete "gound" and insert -- ground --, therefor.

In Column 5, Line 21, delete "gound" and insert -- ground --, therefor.

In Column 5, Line 23, delete "gound" and insert -- ground --, therefor.

In Column 5, Line 26, delete "gound" and insert -- ground --, therefor.

In Column 6, Line 55, delete "gound" and insert -- ground --, therefor.

In Column 6, Line 58, delete "gound" and insert -- ground --, therefor.

In Column 6, Line 60, delete "gound" and insert -- ground --, therefor.

In Column 6, Line 63, delete "gound" and insert -- ground --, therefor.

In Column 8, Line 21, delete "gound" and insert -- ground --, therefor.

In Column 8, Line 24, delete "gound" and insert -- ground --, therefor.

In Column 8, Line 26, delete "gound" and insert -- ground --, therefor.

In Column 8, Line 29, delete "gound" and insert -- ground --, therefor.

In Column 10, Line 5, delete "(RE)" and insert -- (RF) --, therefor.

In Column 12, Line 22, delete "time" and insert -- time. --, therefor.

In Column 12, Line 52, delete ""ReevTrackElements"" and insert -- "RecvTrackElemets" --, therefor.

In Column 13, Line 7, delete "algorithm" and insert -- algorithm. --, therefor.

In Column 17, Line 23, delete "dragable," and insert -- draggable, --, therefor.

In Column 17, Line 42, delete "dragable," and insert -- draggable, --, therefor.

In Column 17, Line 61, delete "dragable," and insert -- draggable, --, therefor.

In Column 18, Line 60, delete "one of" and insert -- one of: --, therefor.

In Column 20, Line 34, delete "RE" and insert -- RF --, therefor.

Signed and Sealed this
Fourteenth Day of April, 2015

Michelle K. Lee
*Director of the United States Patent and Trademark Office*